US006731638B1

(12) United States Patent
Ofek

(10) Patent No.: US 6,731,638 B1
(45) Date of Patent: May 4, 2004

(54) SWITCH SCHEDULING WITH COMMON TIME REFERENCE

(75) Inventor: Yoram Ofek, Riverdale, NY (US)

(73) Assignee: Synchrodyne Networks, Inc., Riverdale, NY (US)

( * ) Notice: Subject to any disclaimer, the term of this patent is extended or adjusted under 35 U.S.C. 154(b) by 0 days.

(21) Appl. No.: 09/418,970

(22) Filed: Oct. 14, 1999

(51) Int. Cl.[7] .............................................. H04L 12/56
(52) U.S. Cl. .................. 370/395.4; 370/399; 370/409; 370/413
(58) Field of Search ................................ 370/230, 231, 370/235, 236, 389, 392, 395.1, 398, 399, 395.4, 409, 412, 413, 428, 429

(56) References Cited

U.S. PATENT DOCUMENTS

| | | | | |
|---|---|---|---|---|
| 4,926,418 A | | 5/1990 | Cidon et al. ............... 370/85.5 |
| 5,255,265 A | * | 10/1993 | Eng et al. ................... 370/416 |
| 5,301,055 A | * | 4/1994 | Bagchi et al. ................ 398/54 |
| 5,572,522 A | * | 11/1996 | Calamvokis et al. ....... 370/390 |
| 5,841,771 A | * | 11/1998 | Irwin et al. ................. 370/360 |
| 5,850,395 A | * | 12/1998 | Hauser et al. .............. 370/398 |
| 5,923,656 A | * | 7/1999 | Duan et al. .............. 370/395.4 |
| 5,959,993 A | * | 9/1999 | Varma et al. ............... 370/397 |
| 6,295,295 B1 | * | 9/2001 | Wicklund .................... 370/392 |
| 6,396,834 B1 | * | 5/2002 | Bonomi et al. ............. 370/394 |

OTHER PUBLICATIONS

R.W. Kembel, "The FibreChannel Consultant: Arbitrated Loop", Connectivity Solutions, Tucson, AZ, Chapters 1 and 2, pp. 1–47.

W. Stallings, "ISDN An Introduction", MacMilliam Publishing Co., NY (1989), pp. 119–122.
P. Dana, "Global Positioning System (GPS) Time Dissemination for Real–Time Applications", Real–Time Systems, 12, 9–40 (1997), Kluwer Academic Publishers, Boston, MA, pp 9–40.
A. Jacob, "A Survey of Fast Packet Switches", Computer Committee Review, IEEE, Jan. 1990, pp. 54–64.
A.G. Fraser, "Early Experiments with Asynchronous Time Division Networks", IEEE Networks, Jan. 1993, pp 12–26.
M. Hamdi et al., "Voice Service Interworking for PSTN and IP Networks", IEEE Communications Magazine, May 1999, pp 104–111.

(List continued on next page.)

Primary Examiner—Alpus H. Hsu
(74) Attorney, Agent, or Firm—Sitrick & Sitrick

(57) ABSTRACT

The input buffer switch scheduling method in this invention is tailored to operate responsively with respect to a global common time reference, such that the switching delay from input to output is deterministic. Consequently, such a switch can be employed in the construction of very high speed virtual leased lines (VLLs). Such VLLs can carry real-time traffic over packet switching networks while guaranteeing end-to-end performance. The switching and data packet forwarding method combines the advantages of both circuit and packet switching. According to the invention, timing information is not used for routing, and therefore, in the Internet, for example, the routing is done using IP addresses or an MPLS tag/label. Also, according to this invention, the switch memory access bandwidth is independent of the number of switching input/output ports. This provides the desired scalability property to the switch design, which is a direct outcome of using input port buffering together with a novel switch scheduling method.

66 Claims, 23 Drawing Sheets

OTHER PUBLICATIONS

J.C. Bellamy, "Digital Network Synchronization", IEEE Communications Magazine, Apr. 1995, pp. 70–83.

E.W. Zegura, "Architectures for ATM Switching Systems", IEEE Communications Magazine, Feb. 1993, pp. 28–37.

A. Pattavina, "Nonblocking Architectures for ATM Switching", IEEE Communications Magazine, Feb. 1993, pp. 38–48.

*Serial Storage Architecture A Technology Overview*, version 3.0, SSA Industry Association 1995, pp. 1–43.

Y. Ofek, "Overview of the MetaRing Architecture", *Computer Networks and ISDN Systems*, vol. 26 (1994), pp. 817–829.

M. Baldi, et al., "End-to-End Delay Analysis of Videoconferencing Over Packet Switched Networks", IEEE Infocom, Jan. 29, 1998, Title page and pp. 1–27.

S.J.Golestani, "A Framing Strategy for Congestion Management", *IEEE Journal on Selected Areas in Communications*, vol. 9, No. 7, Sep. 1991, pp. 1064–1077.

Li et al., "Pseudo-isonchronous Cell Forwarding", *Computer Networks and ISDN Systems*, vol. 30 (1998), pp. 2359–2372.

Li et al., "Time-driven Priority' Flow Control for Real-time Heterogeneous Internetworking", *Proceedings of Infocom*, vol. 15, Los Alamitos, CA, Mar. 1996, pp. 189197.

* cited by examiner

| 4B/5B encoding scheme | | |
|---|---|---|
| HEX DATA | 4-bit Binary Data | 5-bit Encoded Data Codeword |
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

| 4B/5B encoding scheme | | |
|---|---|---|
| Control Input | | 10-bit Encoded Control Codeword |
| HEX DATA | Binary Data | |
| 1 | 0001 | 11111 11111 |
| 2 | 0010 | 01101 01101 |
| 3 | 0011 | 01101 11001 |
| 4 | 0100 | 11111 00100 |
| 5 | 0101 | 01101 00111 |
| 6 | 0110 | 11001 00111 |
| 7 | 0111 | 11001 11001 |
| 8 | 1000 | 00100 00100 |
| 9 | 1001 | 00100 11111 |
| A | 1010 | 00100 00000 |
| B | 1011 | 00111 00111 |
| C | 1100 | 00111 11001 |
| D | 1101 | 00000 00100 |
| E | 1110 | 00000 11111 |
| F | 1111 | 00000 00000 |

P1/P2, M1 values

P1/P2=00 - CBR – constant bit rate
P1/P2=01 - VBR – variable bit rate
P1/P2=10 - "Best Effort"
P1/P2=11 - Rescheduled data packet M1=0 - point-to-point packet (one destination)
M1=1 - multicast packet (multiple destinations)

FIG. 14

The following phases - typically, each phase takes one time frame (TF):

| Phase 1) TF(*t*) - receive data packet, route (FIG. 8, computation steps 35-01 to 35-04), and schedule (FIG. 11, computation steps 36-03 to 36-07) | |
|---|---|
| Phase 2) TF(*t+1*) - the packet scheduling and rescheduling controller 36A sends an input request message 61 (FIG. 12) to switch scheduling controller 60. The switch scheduling controller 60 computes the schedule and returns input schedule message 62 to the select buffer and congestion controller 36D. | Possibly more times for rescheduling of: VBR, MCST (multicast) and "Best Effort") - after receiving Input reject message 63 |
| Phase 3) TF(*t+2*) - The select buffer and congestion controller 36D forwards the data units to the output port 40 via switching fabric 50 according to the input schedule message 62 | |
| Phase 4) TF(*t+3*) - The output port 40 forward the data packet received during TF(*t+2*) via the serial transmitter 49. | |

FIG. 23

Compute schedule for each data unit in the:

> Input request message - 61: <$B_i$, I#, O#, POS=1, P1/P2, S > <$B_i$, I#, O#, POS=2, P1/P2, S > ...
> One request for every switched packet
> Thus, multiple requests for multicast packet

Given:
For TF(*t+1*) there are two vectors size *n* (slots)
for switching from input to output:
 $I[t,s]$ (such that: $1 <= s <= n$) *for* the input port, and
 $O[t,s]$ (such that: $1 <= s <= n$) for the output port

Initialization:
At the beginning of the schedule computation of each time frame:
$I[t,s] = O[t,s] = 0$ (such that: $1 <= s <= n$)

Compute:
For slot *s=1 to n* find the first slot that is available
in both $I[t,s] = 0$ and $O[t,s] = 0$, then DO:
 - $I[t,s] = O[t,s] := 1$
 - *s* is the slot number in which the data unit should be transferred
 from input, I#, to output, O#, through the fabric 50

SWITCH SCHEDULING WITH COMMON TIME REFERENCE

RELATED APPLICATIONS

Not Applicable.

FEDERALLY SPONSORED RESEARCH OR DEVELOPMENT

Not Applicable.

BACKGROUND OF THE INVENTION

This invention relates to generally to a method and apparatus for transmitting of data on a communications network. More specifically, this invention relates to timely forwarding and delivery of data packet across a switch with known predefined delay, jitter and loss. Consequently, the end-to-end performance parameters, such as, loss, delay and jitter, have predefined values, which can be with either deterministic or probabilistic guarantees.

Circuit-switched networks, which are still the main carrier of streams of real-time traffic, are designed for telephony service and cannot be easily enhanced to support multiple services or carry multimedia traffic. Its synchronous byte switching enables circuit-switching networks to transport data streams at constant rates with little delay or jitter. However, since circuit-switching networks allocate resources exclusively for individual connections, they suffer from low utilization under bursty traffic. Moreover, it is difficult to dynamically allocate circuits of widely different capacities, which makes it a challenge to support multimedia traffic. Finally, the synchronous byte switching of Synchronous Optical NETwork (SONET) or Synchronous Digital Hierarchy (SDH), requires increasingly more precise clock synchronization as the lines speed increases [John C. Bellamy, "Digital Network Synchronization", *IEEE Communications Magazine*, April 1995, pp. 70–83].

Packet switching networks like IP (Internet Protocol)-based Internet and Intranets [see, for example, A.Tannebaum, *Computer Networks* (3rd Ed.) Prentice Hall, 1996] and ATM (Asynchronous Transfer Mode) [see, for example, Handel et al.,*ATM Networks*: Concepts, Protocols, and Applications, (2nd Ed.) Addison-Wesley, 1994] handle bursty data more efficiently than circuit switching, due to their statistical multiplexing of the packet streams. However, current packet switches and routers operate asynchronously and provide "best effort" service only, in which end-to-end delay and jitter are neither guaranteed nor bounded. Furthermore, statistical variations of traffic intensity often lead to congestion that results in excessive delays and loss of packets, thereby significantly reducing the fidelity of real-time streams at their points of reception.

Efforts to define advanced services for both IP and ATM networks have been conducted in two levels: (1) definition of service, and (2) specification of methods for providing different services to different packet streams. The former defines interfaces, data formats, and performance objectives. The latter specifies procedures for processing packets by hosts and switches/routers. The types of services that defined for ATM include constant bit rate (CBR), variable bit rate (VBR) and available bit rate (ABR).

The methods for providing different services under packet switching fall under the general title of Quality of Service (QoS). Prior art in QoS can be divided into two parts: (1) traffic shaping with local timing without deadline scheduling, for example [Demers et al., "Analysis and Simulation Of A Fair Queuing Algorithm", *ACM Computer Communication Review* (SIGCOMM'89), pp. 3–12, 1989; S. J, Golestani, "Congestion Free Communication In High-Speed Packet Networks", *IEEE Transcripts on Communications*, COM-39(12): 1802–1812, December 1991; Parekh et. al., "A Generalized Processor Sharing Approach To Flow Control—-The Multiple Node Case", ACM Transactions on Networking, 2(2): 137–150, 1994], and (2) traffic shaping with deadline scheduling, for example [Ferrari et. al., "A Scheme For Real-Time Channel Establishment In Wide Area Networks", *IEEE Journal on Selected Areas* in Communication, SAC-8(4): 368–379, April 1990]. Both of these approaches rely on manipulation of local queues by each router with little or no coordination with other routers. These approaches have inherent limitations when used to transport real-time streams. When traffic shaping without deadline scheduling is configured to operate at high utilization with no loss, the delay and jitter are inversely proportional to the connection bandwidth, which means that low rate connections may experience large delay and jitter inside the network. In traffic shaping with deadline scheduling the delay and jitter are controlled at the expense of possible congestion and loss.

The real-time transport protocol (RTP) [H. Schultzrinne et. al, "RTP: A Transport Protocol for Real-Time Applications", IETF Request for Comment RFC1889, January 1996] is a method for encapsulating time-sensitive data packets and attaching to the data time related information like time stamps and packet sequence number. RTP is currently the accepted method for transporting real time streams over IP internetworks and packet audio/video telephony based on ITU-T H.323.

One approach to an optical network that uses synchronization was introduced in the synchronous optical hypergraph [Y. Ofek, "The Topology, Algorithms And Analysis Of A Synchronous Optical Hypergraph Architecture", Ph.D. Dissertation, Electrical Engineering Department, University of Illinois at Urbana, Report No. UIUCDCS-R-87 1343, May 1987], which also relates to how to integrate packet telephony using synchronization [Y. Ofek, "Integration Of Voice Communication On A Synchronous Optical Hypergraph", IEEE INFOCOM'88, 1988]. In the synchronous optical hypergraph, the forwarding is performed over hyper-edges, which are passive optical stars. In [Li et al., "Pseudo-Isochronous Cell Switching In ATM Networks", IEEE INFOCOM'94, pp. 428–437, 1994; Li et al., "Time-Driven Priority: Flow Control For Real-Time Heterogeneous Internetworking", IEEE INFOCOM'96, 1996] the synchronous optical hypergraph idea was applied to networks with an arbitrary topology and with point-to point links. The two papers [Li et al., "Pseudo-Isochronous Cell Switching In ATM Networks", IEEE INFOCOM'94, pages 428–437, 1994; Li et al., "Time-Driven Priority: Flow Control For Real-Time Heterogeneous Internetworking", IEEE INFOCOM'96, 1996] provide an abstract (high level) description of what is called "RISC-like forwarding", in which a packet is forwarded, with little if any details, one hop every time frame in a manner similar to the execution of instructions in a Reduced Instruction Set Computer (RISC) machine.

Switching architectures for data packet have been extensively studied and developed in the past three decades, see for example [A. G. Fraser, "Early Experiment with Asynchronous Time Division Networks", IEEE Networks, pp. 12–26, January 1993. Several surveys of packet switching architectures can be found in: [E. W. Zegura, "Architecture for ATM Switching Systems", IEEE Communications Magazine, February 1993, pages 28–37; A. Pattavina, "Non-blocking Architecture for ATM Switching", IEEE Communications Magazine, February 1993, pages 37–48; A. R. Jacob, "A Survey of Fast Packet Switches", Computer Communications Review, January 1990, pages 54–64].

SUMMARY OF THE INVENTION

In accordance with the present invention, the switch scheduling method disclosed is tailored to operate responsive to global common such that the switching delay from input to out put is deterministic and is known in advance. Consequently, such a switch can be employed in the construction of a synchronous virtual pipe (or simply a virtual pipe). Such virtual pipes can carry real-time traffic over packet switching networks while guaranteeing end-to-end performance. The switching and data packet forwarding method combines the advantages of both circuit and packet switching. It provides for allocation for the exclusive use of predefined connections and for those connections it guarantees loss free transport with low delay and jitter. When predefined connections do not use their allocated resources, other non-reserved data packets can use them without affecting the performance of the predefined connections.

Under the aforementioned prior art methods for providing packet switching services, switches and routers operate asynchronously. The present invention provides real-time services by synchronous methods that utilize a time reference that is common to the switches and end stations comprising a wide area network. The common time reference can be realized by using UTC (Coordinated Universal Time), which is globally available via, for example, GPS (Global Positioning System—see, for example: [Peter H. Dana, "Global Positioning System (GPS) Time Dissemination for Real-Time Applications", Real-Time Systems, 12, pp. 9–40, 1997]. By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http://www.boulder.nist.gov/timefreq) is responsible for coorinating UTC with the International Bureau of Weights and Measures (BIPM) in Paris.

UTC timing is readily available to individual PCs through GPS cards. For example, TrueTime, Inc. (Santa Rosa, Calif.) offers a product under the tradename PCI-SG which provides precise time, with zero latency, to computers that have PCI extension slots. Another way by which UTC can be provided over a network is by using the Network Time Protocol (NTP) [D. Mills, "Network Time Protocol" (version 3) IETF RFC 1305]. However, the clock accuracy of NTP is not adequate for inter-switch coordination, on which this invention is based.

In accordance with the present invention, the synchronization requirements are independent of the physical link transmission speed, while in circuit switching the synchronization becomes more and more difficult as the link speed increases.

In accordance with the present invention, timing information is not used for routing, and therefore, in the Internet, for example, the routing is done using IP addresses or an IP tag/label.

These and other aspects and attributes of the present invention will be discussed with reference to the following drawings and accompanying specification.

BRIEF DESCRIPTION OF THE DRAWINGS:

FIG. 14 illustrates the four pipelined forwarding phases of forwarding data packets as in the present invention;

FIG. 23 illustrates further details of the scheduling computation of the switch scheduling controller of the present invention.

DETAILED DESCRIPTION OF THE PREFERRED EMBODIMENT

Figure 1:
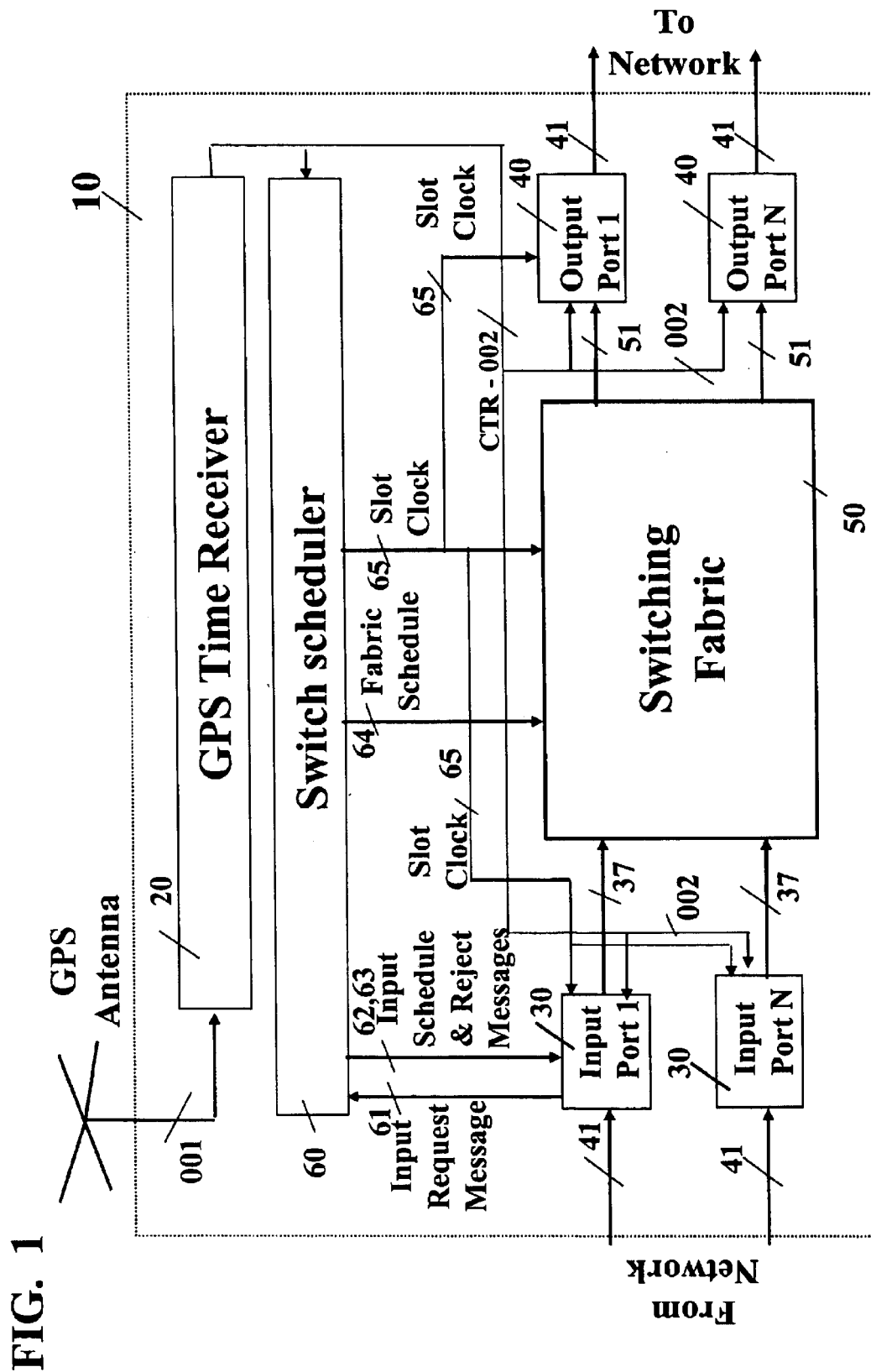
FIG. 1 is a schematic block diagram of one embodiment of a switch with a switch scheduler as in the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The present invention relates to a system and method for switching and forwarding packets over a packet switching network. The switches of the network maintain a common time reference, which is obtained either from an external source (such as GPS—Global Positioning System) or is generated and distributed internally. The common time reference is used to define time intervals, which include time super-cycles, time cycles, time frames, time slots, and other kinds of time intervals. The time intervals are arranged both in simple periodicity and complex periodicity (like seconds and minutes of a clock).

A packet that arrives to an input port of a switch, is switched to an output port based on specific routing information in the packet's header (e.g., IPv4 destination address in the Internet, VCI/VPI labels in ATM). Each switch along a route from a source to a destination forwards packets in periodic time intervals that are predefined using the common time reference.

A time interval duration can be longer than the time duration required for communicating a packet, in which case the exact position of a packet in the time interval is not predetermined. A packet is defined to be located within the time interval which contains the communication of the first bit of the packet, even if the length of the packet is sufficiently long to require multiple time intervals to communicate the entire packet.

Packets that are forwarded inside the network over the same route and in the same periodic time intervals constitute a virtual pipe and share the same pipe-ID. A pipe-ID can be either explicit, such as a tag or a label that is generated inside the network, or implicit such as a group of IP addresses. A virtual pipe can be used to transport data packets from multiple sources and to multiple destinations. The time interval in which a switch forwards a specific packet is determined by the packet's pipe-ID, the time it reaches the switch, and the current value of the common time reference.

A virtual pipe provides deterministic quality of service guarantees. In accordance with the present invention, congestion-free packet switching is provided for pipe-IDs in which capacity in their corresponding forwarding links and time intervals is reserved in advance. Furthermore, packets that are transferred over a virtual pipe reach their destination in predefined time intervals, which guarantees that the delay jitter is smaller than or equal to one time interval.

Packets that are forwarded from one source to multiple destinations share the same pipe ID and the links and time intervals on which they are forwarded comprise a virtual tree. This facilitates congestion-free forwarding from one input port to multiple output ports, and consequently, from one source to multiplicity of destinations. Packets that are destined to multiple destinations reach all of their destinations in predefined time intervals and with delay jitter that is no larger than one time interval.

A system is provided for managing data transfer of data packets from a source to a destination. The transfer of the data packets is provided during a predefined time interval, comprised of a plurality of predefined time frames. The system is further comprised of a plurality of switches. A virtual pipe is comprised of at least two of the switches interconnected via communication links in a path. A common time reference signal is coupled to each of the switches, and a time assignment controller assigns selected predefined time frames for transfer into and out from each of the respective switches responsive to the common time reference signal. Each communications link may use a different time frame duration generated from the common time reference signal.

For each switch, there is a first predefined time frame within which a respective data packet is transferred into the respective switch, and a second predefined time frame within which the respective data packet is forwarded out of the respective switch, wherein the first and second predefined time frames may have different durations. The time assignment provides consistent fixed intervals between the time between the input to and output from the virtual pipe.

In a preferred embodiment, there is a predefined subset of the predefined time frames during which the data packets are transferred in the switch, and for each of the respective switches, there are a predefined subset of the predefined time frames during which the data packets are transferred out of the switch.

Each of the switches is comprised of one or a plurality of uniquely addressable input and output ports. A routing controller maps each of the data packets that arrives at each one of the input ports of the respective switch to a respective one or more of the output ports of the respective switch.

For each of the data packets, there is an associated time of arrival to a respective one of the input ports. The time of arrival is associated with a particular one of the predefined time frames. For each of the mappings by the routing controller, there is an associated mapping by a scheduling controller, which maps of each of the data packets between the time of arrival and forwarding time out. The forwarding time out is associated with a specified predefined time frame.

In the preferred embodiment, there are a plurality of the virtual pipes comprised of at least two of the switches interconnected via communication links in a path. The communication link is a connection between two adjacent switches; and each of the communications links can be used simultaneously by at least two of the virtual pipes. Multiple data packets can be transferred utilizing at least two of the virtual pipes.

In some configurations of this invention there is a fixed time difference, which is constant for all switches, between the time frames for the associated time of arrival and forwarding time out for each of the data packets. The fixed time difference is a variable time difference for some of the switches. A predefined interval is comprised of a fixed number of contiguous time frames comprising a time cycle. Data packets that are forwarded over a given virtual pipe are forwarded from an output port within a predefined subset of time frames in each time cycle. Furthermore, the number of data packets that can be forwarded in each of the predefined subset of time frames for a given virtual pipe is also predefined.

The time frames associated with a particular one of the switches within the virtual pipe are associated with the same switch for all the time cycles, and are also associated with one of input into or output from the particular respective switch.

In some configurations of this invention there is a constant fixed time between the input into and output from a respective one of the switches for each of the time frames within each of the time cycles. A fixed number of contiguous time cycles comprise a super-cycle, which is periodic. Data packets that are forwarded over a given virtual pipe are forwarded from an output port within a predefined subset of time frames in each super-cycle. Furthermore, the number of data packets that can be forwarded in each of the predefined subset of time frames within a super-cycle for a given virtual pipe is also predefined.

In the preferred embodiment the common time reference signal is coupled from a GPS (Global Positioning System), and is in accordance with the UTC (Coordinated Universal Time) standard. The UTC time signal does not have to be received directly from GPS. Such signal can be received by using various means, as long as the delay or time uncertainty associated with that UTC time signal does not exceed half a time frame.

In one embodiment, the super-cycle duration is equal to one second as measured using the UTC (Coordinated Universal Time) standard. In an alternate embodiment the super-cycle duration spans multiple UTC seconds. In another alternate embodiment the super-cycle duration is a fraction of a UTC second. In the most preferred embodiment, the super-cycle duration is a small integer number of UTC seconds.

A select buffer controller maps one of the time frames for output from a first switch to a second time frame for input via the communications link to a second switch. The select buffer controller uses the UTC time signal in order to identify the boundaries between two successive time frames. The select buffer controller inserts a time frame delimiter (TFD) signal into the transmission link in order to the signal the second switch with the exact boundary between two time frames.

Each of the data packets is encoded as a stream of data, and a time frame delimiter is inserted into the stream of data responsive to the select buffer controller. This can be implemented by using a redundant serial codewords as it is later explained.

The communication links can be of fiber optic, copper, and wireless communication links for example, between a ground station and a satellite, and between two satellites orbiting the earth. The communication link between two nodes does not have to be a serial communication link. A parallel communication link can be used—such link can simultaneously carry multiple data bits, associated clock signal, and associated control signals.

The data packets can be Internet protocol (IP) data packets, and asynchronous transfer mode (ATM) cells, and can be forwarded over the same virtual pipe having an associated pipe identification (PID). The PID can be an Internet protocol (IP) address, Internet protocol group multicast address, an asynchronous transfer mode (ATM), a virtual circuit identifier (VCI), and a virtual path identifier (VPI), or (used in combination as VCI/VPI).

The routing controller determines two possible associations of an incoming data packet: (i) the output port, and (ii) the time of arrival (ToA). The ToA is then used by the scheduling controller for determining when a data packet should be forwarded by the select buffer controller to the next switch in the virtual pipe. The routing controller utilizes at least one of Internet protocol version 4 (IPv4), Internet protocol version 6 (IPv6) addresses, Internet protocol group multicast address, Internet MPLS (multi protocol label swapping or tag switching) labels, ATM virtual circuit identifier and virtual path identifier (VCI/VPI), and IEEE 802 MAC (media access control) addresses, for mapping from an input port to an output port.

Each of the data packets is comprised of a header, which includes an associated time stamp. For each of the mappings by the routing controller, there is an associated mapping by the scheduling controller, of each of the data packets between the respective associated time-stamp and an associated forwarding time out, which is associated with one of the predefined time frames. The time stamp can record the time in which a packet was created by its application.

In one embodiment the time-stamp is generated by an Internet real-time protocol (RTP), and by a predefined one of the sources or switches. The time-stamp can be used by a scheduling controller in order to determine the forwarding time of a data packet from an output port.

Each of the data packets originates from an end station, and the time-stamp is generated at the respective end station for inclusion in the respective originated data packet Such generation of a time-stamp can be derived from UTC either by receiving it directly from GPS or by using the Internet's Network Time Protocol (NTP). The time stamp can alternatively be generated at the PT subnetwork boundary, which is the point at which the data enters the synchronous virtual pipe.

In accordance with the present invention, a system is provided for transferring data packets across a data network while maintaining for reserved data traffic constant bounded jitter (or delay uncertainty) and no congestion-induced loss of data packets. Such properties are essential for many multimedia applications, such as, telephony and video teleconferencing.

Figure 3:
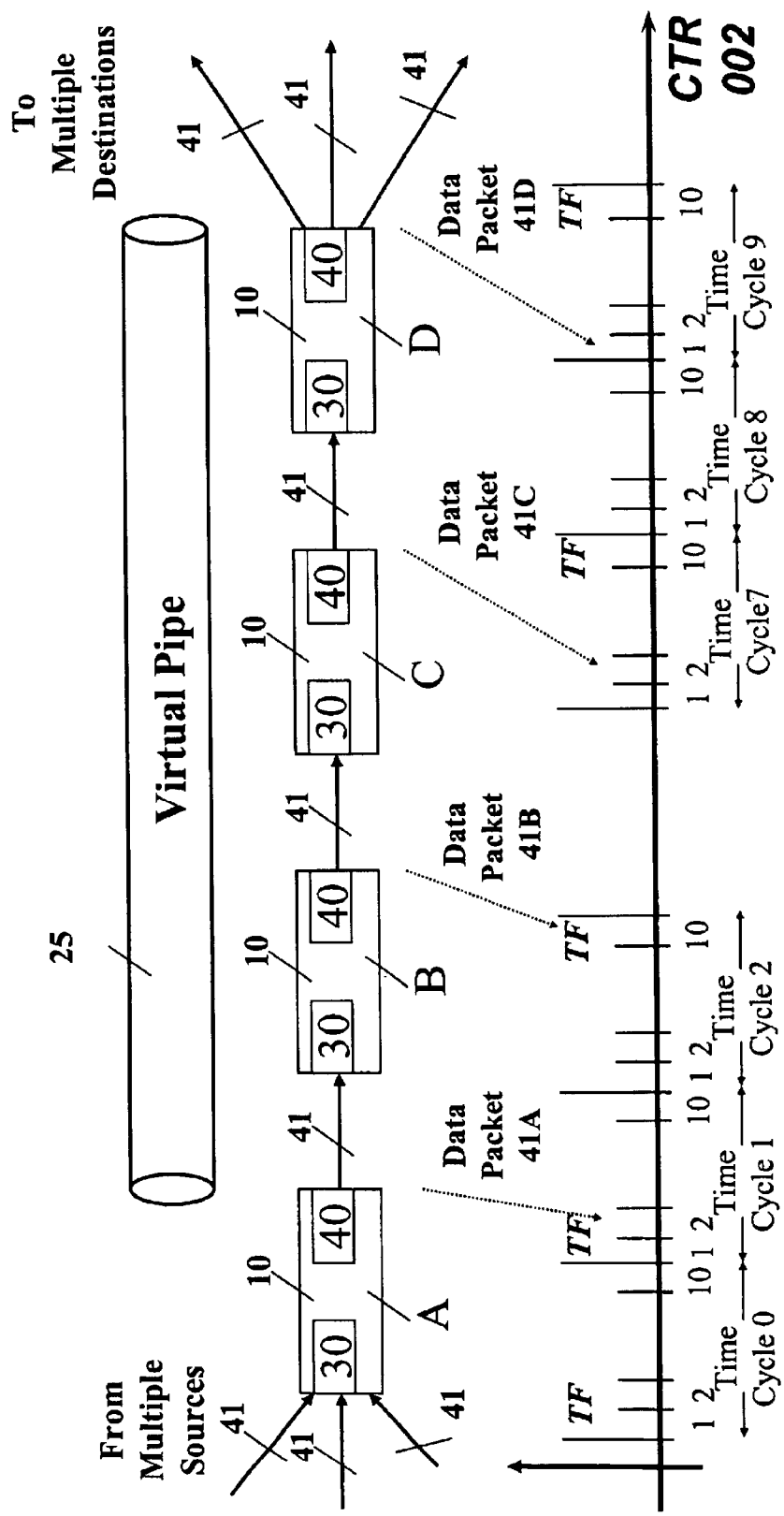
FIG. 3 is a schematic block diagram of a virtual pipe and its timing relationship with a common time reference (CTR) as in the present invention.

In accordance with the design, method, and illustrated implementation of the present invention, one or a plurality of virtual pipes 25 are provided, as shown in FIG. 3, over a data network with general topology. Such data network can span the globe. Each virtual pipe 25 is constructed over one or more switches 10, shown in FIG. 3, which are interconnected via communication links 41 in a path.

FIG. 3 is a schematic illustration of a virtual pipe and its timing relationship with a common time reference (CTR), wherein delay is determined by the number of time frames between the forward time out at Node A and the forward time out at Node D. Each virtual pipe 25 is constructed over one or more switches 10 which are interconnected via communication links 41 in a path.

FIG. 3 illustrates a virtual pipe 25 from the output port 40 of switch A, through switches B and C. The illustrated virtual pipe ends at the output port 40 of node D. The virtual pipe 25 transfers data packets from at least one source to at least one destination.

The data packet transfers over the virtual pipe 25 via switches 10 are designed to occur during a plurality of predefined time intervals, wherein each of the predefined time intervals is comprised of a plurality of predefined time frames. The timely transfers of data packets are achieved by coupling a common time reference signal (not shown) to each of the switches 10.

An output port 40 is connected to a next input port 30 via a communication link 41, as shown in FIG. 3. The communication link can be realized using various technologies compatible with the present invention including fiber optic conduits, copper and other wired conductors, and wireless communication links—including but not limited to, for example, radio frequency (RF) between two ground stations, a ground station and a satellite, and between two satellites orbiting the earth, microwave links, infrared (IR) links, optical communications lasers. The communication link does not have to be a serial communication link. A parallel communication link can be used—such a parallel link can simultaneously carry multiple data bits, associated clock signals, and associated control signals.

FIG. 1 is a schematic block diagram of one embodiment of an SVP switch with a switch scheduler as in the present invention. The SVP switch 10 comprises a common time reference means 20, at least one input port 30, at least one output port 40, a switching fabric 50, and a switch scheduler 60. In the preferred embodiment, the common time reference means 20 is a GPS receiver which receives a source of common time reference 001 (e.g., UTC via GPS) via an antenna as illustrated. The common time reference means 20 provides a common time reference signal 002 to all input ports 30, all output ports 40, and the switch scheduler 60. GPS time receivers are available from variety of manufacturers, such as, TrueTime, Inc. (Santa Rosa, Calif.). With such equipment, it is possible to maintain a local clock with accuracy of ±1 microsecond from the UTC (Coordinated Universal Time) standard everywhere around the globe.

Each respective one of the input ports 30 is coupled to the switch scheduler 60 and to the switching fabric 50. Each respective one of the output ports 40 is coupled to the switch scheduler 60 and to the switching fabric 50. The switching fabric 50 is additionally coupled to the switch scheduler 60.

The switch scheduler 60 supplies a slot clock signal output 65 to each respective one of the input ports 30 and each respective one of the output ports 40. The slot clock is an indication of time slots within a single time frame. The switch scheduler 60 also supplies input schedule messages 62 and input reject messages 63 to each respective one of the input ports 30. Each respective one of the input ports 30 supplies input request messages 61 to the switch scheduler 60. The switch scheduler 60 also supplies a fabric schedule 64 to the switching fabric 50.

The SVP switch 10 of FIG. 1 is also coupled to one or more communications links 41 by way of combination input/output ports 30/40. The communications links 41 can be implemented within an IP network The switch scheduler 60 is constructed of a central processing unit (CPU), a random access memory (RAM) for storing messages, schedules, parameters, and responses, a read only memory (ROM) for storing the switch scheduler processing program and a table with operation parameters.

Figure 2:
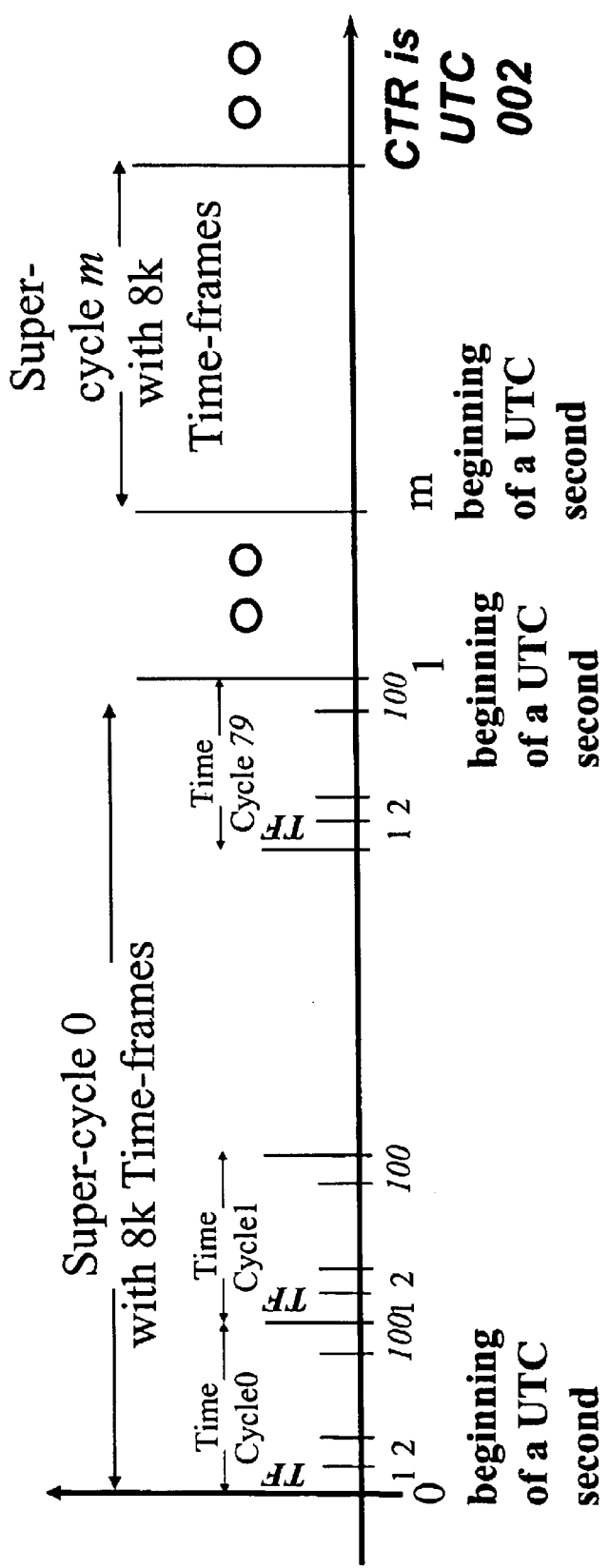
FIG. 2 is a timing diagram of a common time reference (CTR) that is aligned to UTC as utilized by the present invention.

FIG. 2 is an illustration of a common time reference (CTR) that is aligned to UTC. Consecutive time frames are grouped into time cycles. As shown in the example illustrated in FIG. 2, there are 100 time frames in each time cycle. For illustration purposes, the time frames within a time cycle are numbered 1 through 100.

Consecutive time cycles are grouped together into super-cycles, and as shown in FIG. 2, there are 80 time cycles in each super-cycle. For illustration purposes, time cycles within a super-cycle are numbered 0 through 79. Super-cycles 0 and m are shown in FIG. 2.

FIG. 2 is illustrative of the relationship of time frames, time cycles, and super-cycles; in alternate embodiments, the number of time frames within a time cycle may be different than 100, and the number of time cycles within a super-cycle may be different than 80.

FIG. 2 illustrates how the common time reference signal can be aligned with the UTC (Coordinated Universal Time) standard. In this illustrated example, the duration of every super-cycle is exactly one second as measured by the UTC standard. Moreover, as shown in FIG. 2 the beginning of each super-cycle coincides with the beginning of a UTC second. Consequently, when leap seconds are inserted or deleted for UTC corrections (due to changes in the earth rotation period) the cycle and super-cycle periodic scheduling will not be affected. The time frames, time cycles, and super-cycles are associated in the same manner with all respective switches within the virtual pipe at all times.

In the embodiment illustrated in FIG. 2, the super-cycle duration is equal to one second as measured using the UTC (Coordinated Universal Time) standard. In an alternate embodiment the super-cycle duration spans multiple UTC seconds. In another alternate embodiment the super-cycle duration is a fraction of a UTC second. In the most preferred embodiment, the super-cycle duration is a small integer number of UTC seconds. Not illustrated in FIG. 2 is that a time frame may be further divided into time slots in the preferred embodiment.

Pipeline forwarding relates to data packets being forwarded across a virtual pipe 25 with a predefined delay in every stage (either across a communication link 41 or across a SVP switch 10 from input port 30 to output port 40). Data packets enter a virtual pipe 25 from one or more sources and are forwarded to one or more destinations. The SVP switch 10 structure, as shown in FIG. 3, can also be referred to as a pipeline switch, since it enables a network comprised of such switches to operate as a large distributed pipeline architecture, as it is commonly found inside digital systems and computer architectures.

Referring again to FIG. 3, the timely pipeline forwarding of data packets over the virtual pipe 25 is illustrated. In this figure, time cycles each contain 10 time frames, and for clarity the super-cycles are not shown. A data packet is received by one of the input ports 30 of switch A at time frame 1, and is forwarded along this virtual pipe 25 in the following manner: (i) the data packet 41A is forwarded from the output port 40 of switch A at time frame 2 of time cycle 1, (ii) the data packet 41B is forwarded from the output port 40 of switch B, after 18 time frames, at time frame 10 of time cycle 2, (iii) the data packet 41C is forwarded from the output port 40 of switch C, after 42 time frames, at time frame 2 of time cycle 7, and (iv) the data packet 41D is forwarded from the output port 40 of switch D, after 19 time frames, at time frame 1 of time cycle 9.

As illustrated in FIG. 3,

All data packets enter the virtual pipe 25 (i.e., forwarded out of the output port 40 of switch A) periodically at the second time frame of a time cycle, are output from this virtual pipe 25 (i.e., are forwarded out of the output port 40 of switch D) after 79 time frames.

The data packets that enter the virtual pipe 25 (i.e., forwarded out of the output port 40 of switch A) can come from one or more sources and can reach switch A over one or more inputs via communications links 41.

The data packets that exit the virtual pipe 25 (i.e., forwarded out of the output port 40 of switch D) can be forwarded over plurality of outputs via communications links 41 to one of plurality of destinations.

The data packets that exit the virtual pipe 25 (i.e., forwarded out of the output port 40 of switch D) can be forwarded simultaneously to multiple destinations, (i.e., multi-cast (one-to-many) data packet forwarding).

The communication link 41 between two adjacent ones of the switches 10 can be used simultaneously by at least two of the virtual pipes.

A plurality of virtual pipes can multiplex (i.e., mix their traffic) over the same communication links.

A plurality of virtual pipes can multiplex (i.e., mix their traffic) during the same time frames and in an arbitrary manner.

The same time frame can be used by multiple data packets from one or more virtual pipes.

For each virtual pipe there are predefined time frames within which respective data packets are transferred into its respective switches, and separate predefined time frames within which the respective data packets are transferred out of its respective switches. Though the time frames of each virtual pipe on each of its switches can be assigned in an arbitrary manner along the common time reference, it is convenient and practical to assign time frames in a periodic manner in time cycles and super-cycles.

The SVP switch 10 structure, as shown in FIG. 3, can also be referred to as a pipeline switch, since it enables a network comprised of such switches to operate as a large distributed pipeline architecture, as it is commonly found inside digital systems and computer architectures.

Figure 4:
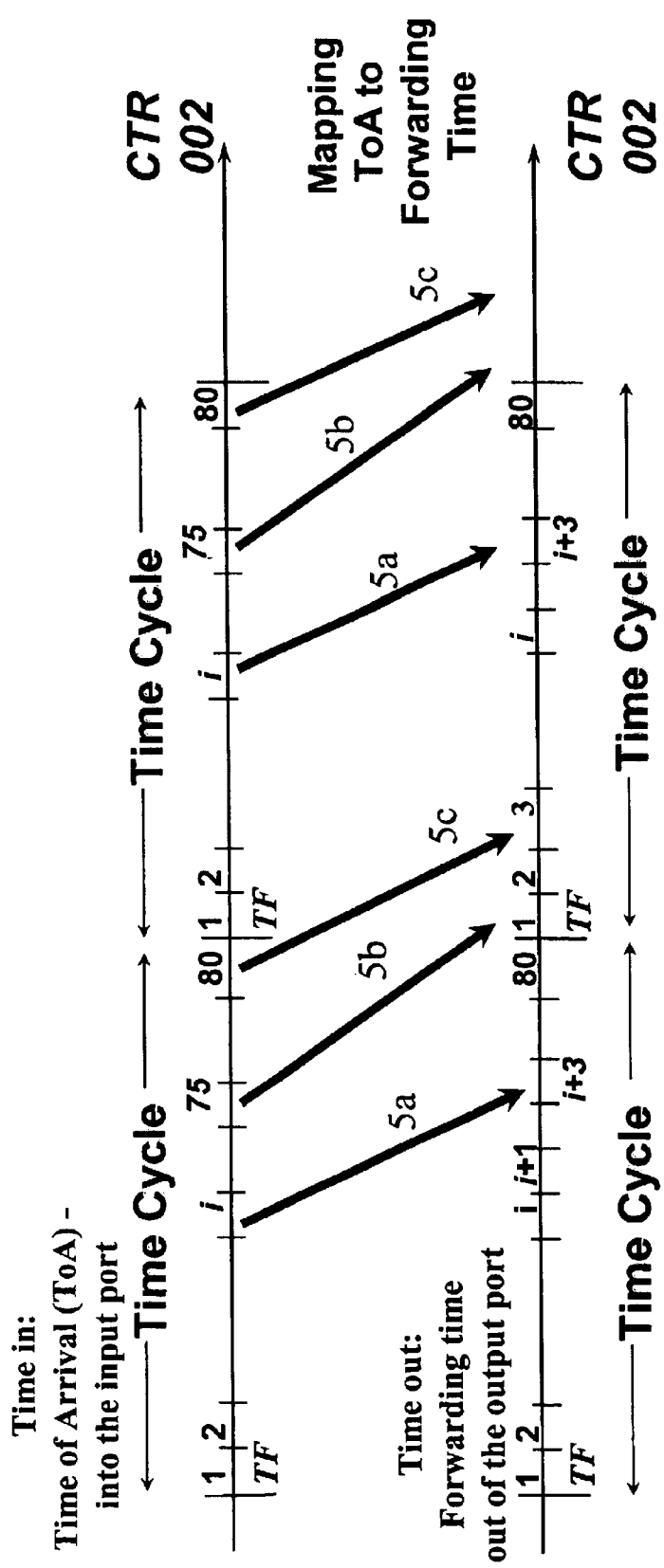
FIG. 4 illustrates the mapping of the time frames into and out of a node on a virtual pipe of the present invention.

FIG. 4 illustrates the mapping of the time frames into and out of a node on a virtual pipe, wherein the mapping repeats itself in every time cycle illustrating the time in, which is the time of arrival (ToA), versus the time out, which is the forwarding time out of the output port. FIG. 4 thereby the periodic scheduling and forwarding timing of a switch of a virtual pipe wherein there are a predefined subset of time frames (i, 75, and 80) of every time cycle, during which data packets are transferred into that switch, and wherein for that virtual pipe there are a predefined subset time frames (i+3, 1, and 3) of every time cycle, during which the data packets are transferred out of that switch.

In the illustrated example of FIG. 4, a first data packet 5a arriving at the input port of the switch at time frame i is forwarded out of the output port of the switch at time frame i+3. In this example the data packet is forwarded out of the output port at a later time frame within the same time cycle in which it arrived. The delay in transiting the switch dts determines a lower bound on the value (i+dts). In the illustrated example, dts must be less than or equal to 3.

Also as shown in FIG. 4, a second data packet 5b arriving at the input port of the switch at time frame 75 is forwarded out of the output port of the switch at time frame 1 within the next time cycle. In this example the data packet is forwarded out of the output port at a earlier numbered time frame but within the next time cycle from which it arrived. Note that data packets in transit may cross time cycle boundaries.

If—for example—each of the three data packets has 125 bytes (i.e. 1000 bits), and there are 80 time frames of 125 microseconds in each time cycle (i.e. a time cycle duration of 10 milliseconds), then the bandwidth allocated to this virtual pipe is 300,000 bits per second. In general, the bandwidth or capacity allocated for a virtual pipe is computed by dividing the number of bits transferred during each of the time cycles by the time cycle duration. In the case of a bandwidth in a super-cycle, the bandwidth allocated to a virtual pipe is computed by dividing the number of bits transferred during each of the super-cycles by the super-cycle duration.

Figures 5A, 5B, 5C:
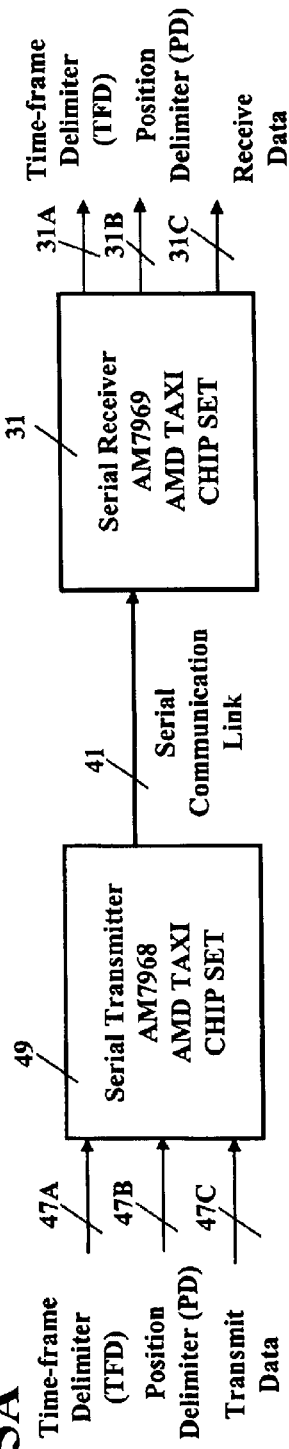
FIG. 5A is an schematic block diagram of a serial transmitter and a serial receiver connected as in the present invention.
FIG. 5B is a table illustrating a 4B/5B encoding scheme for data.
FIG. 5C is a table illustrating a 4B/5B encoding scheme for control signals.

FIG. 5A is an illustration of a serial transmitter and a serial receiver. FIG. 5B is a table illustrating the 4B/5B encoding scheme for data, and FIG. 5C is a table illustrating the 4B/5B encoding scheme for control signals.

Referring to FIG. 5A, a serial transmitter 49 and serial receiver 31 are illustrated as coupled to each communications link 41. A variety of encoding schemes can be used for a serial line communications link 41 in the context of this invention, such as, SONET/SDH, 8B/10B Fiber Channel, and 4B/5B Fiber Distributed Data Interface (FDDI). In addition to the encoding and decoding of the data transmitted over the serial link, the serial transmitter/receiver (49 and 31) sends/receives control words for a variety of in-band control purposes, mostly unrelated to the present invention description.

However, two control words, time frame delimiter (TFD) and position delimiter (PD) are used in accordance with the present invention. The TFD marks the boundary between two successive time frames and is sent by a serial transmitter 49 when a CTR 002 clock tick occurs in a way that is described hereafter as part of the output port operation. The PD is used to distinguish between multiple positions within a time frame and is sent by a serial transmitter 49 upon receipt of a position delimiter input 47B.

It is necessary to distinguish in an unambiguous manner between the data words, which carry the information, and the control signal or words (e.g., the TFD is a control signal) over the serial communications link 41. There are many ways to do this. One way is to use the known 4B/5B encoding scheme (used in FDDI). In this scheme, every 8-bit character is divided into two 4-bit parts and then each part is encoded into a 5-bit codeword that is transmitted over the serial communications link 41.

In a preferred embodiment the serial transmitter 49 and receiver 31 comprise AM7968 and AM7969 chip sets, respectively, both manufactured by AND Corporation.

FIG. 5B illustrates an encoding table from 4-bit data to 5-bit serial codeword. The 4B/5B is a redundant encoding scheme, which means that there are more codeword than data words. Consequently, some of the unused or redundant serial codeword can be used to convey control information.

FIG. 5C is a table with 15 possible encoded control codeword, which can be used for transferring the time frame delimiter (TFD) over a serial link. The TFD transfer is completely transparent to the data transfer, and therefore, it can be sent in the middle of the data packet transmission in a non-destructive manner.

When the communication links 41 are SONET/SDH, the time frame delimiter cannot be embedded as redundant serial codeword, since SONET/SDH serial encoding is based on scrambling with no redundancy. Consequently, the TFD is implemented using the SONET/SDH frame control fields: transport overhead (TOH) and path overhead (POH). Note that although SONET/SDH uses a 125 microseconds frame, it cannot be used directly in accordance with the present invention, at the moment, since SONET/SDH frames are not globally aligned and are also not aligned to UTC. However, if SONET/SDH frames are globally aligned, SONET/SDH can be used compatibly with the present invention.

Figure 7:
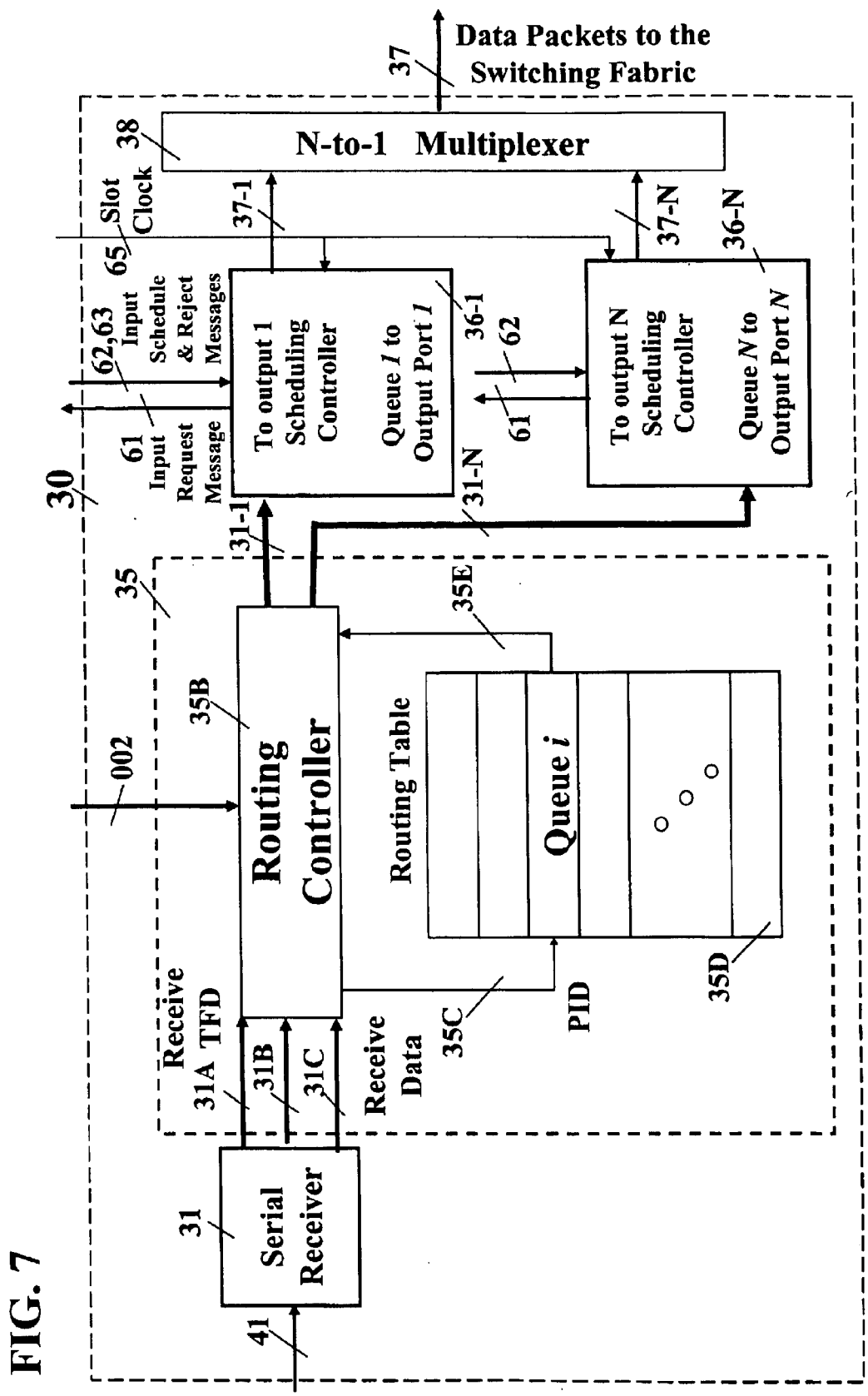
FIG. 7 is a schematic block diagram of an input port of the present invention.

FIG. 7 is a schematic block diagram of an input port of the present invention, which comprises a serial receiver 31, an input controller 35, a plurality of output scheduling controllers (36-1 . . . 36-N, collectively 36), and an N-to-1 multiplexer 38. Referring simultaneously to FIGS. 5 and 7, the serial receiver 31 transfers the received data packets (31C), the time frame delimiters (31A), and the position delimiters (31B) to the routing controller 35.

The input controller 35 comprises a routing controller 35B that is constructed of a central processing unit (CPU), a random access memory (RAM) for storing the data packet, read only memory (ROM) for storing the routing controller processing program; and a routing table 35D that is used for determining which respective ones of the output scheduling controllers 36 that the incoming data packet should be switched to.

Figures 6A, 6B:
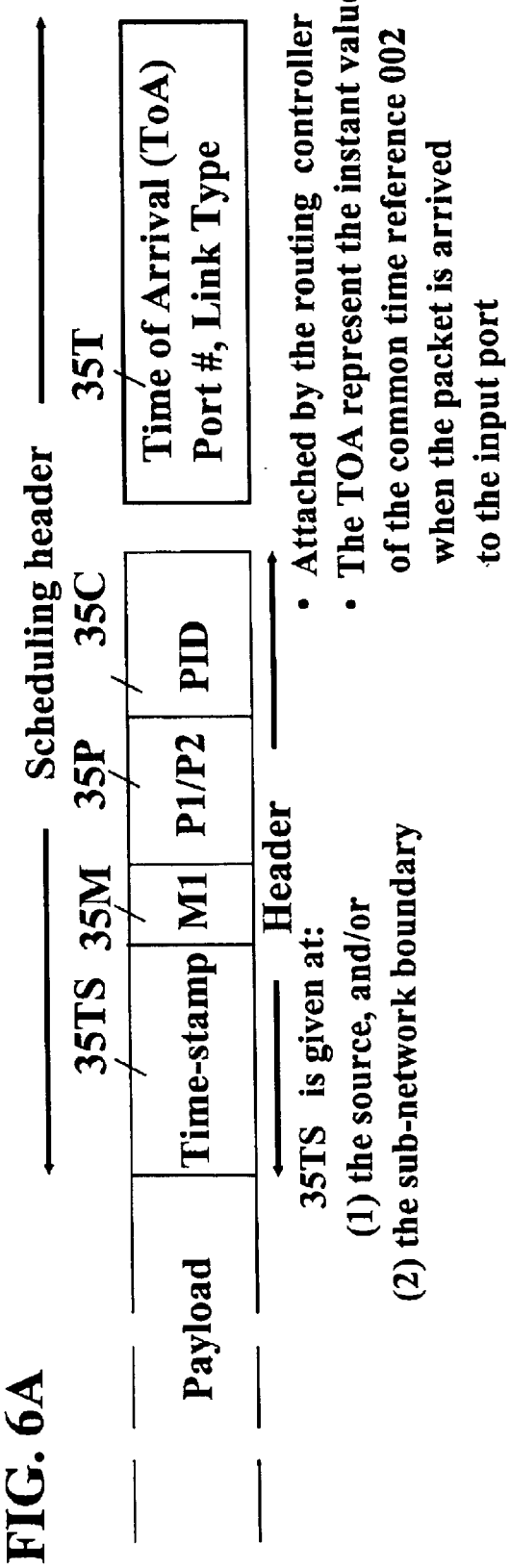
FIG. 6A is an map of a data packet with a header as utilized in the present invention.
FIG. 6B maps additional detail of the encoding in FIG. 6A.

FIG. 6A is an illustration of a data packet structure with a header that includes a time stamp, two priority bits, a multi-cast bit, and an attached time of arrival (ToA), port number, and link type. In FIG. 6A the packet header, together with the attached time of arrival (ToA), port number, and link type, constitute a scheduling header. The scheduling header is used for scheduling the data packet switching from input to output. FIG. 6B is additional detail about the encoding of the priority and multi-cast bits of FIG. 6A.

In one embodiment, an incoming data packet consists of a header and a payload portion. The header includes, as shown in FIGS. 6A and 6B, a time stamp value 35TS, a multi-cast indication 35M, a priority indication 35P, and a virtual PID indication 35C. The priority indication 35P may include encoding of a high and a low priority. In an alternate embodiment, multiple levels of priority are encoded by priority indication 35P. In a preferred embodiment the multiple levels of priority include Constant Bit Rate (CBR) priority, Variable Bit Rate (VBR) priority, "best-effort" (BE) priority, and Rescheduled priority. The multi-cast indication 35M may include encoding indicating one destination or a plurality of destinations. In the case of a plurality of destinations there can be one or more PIDs.

Referring back to FIG. 7, the incoming data packet header includes a virtual pipe identification, PID 35C, that is used to lookup in the routing table 35D the address 35E of the output scheduling controllers 36 that the incoming data packet should be switched to.

Before the incoming data packet is transferred into its output scheduling controller(s) 36, the time of arrival (ToA) information 35T is attached to the data packet header as illustrated in FIGS. 6A and 6B. The ToA information is the value of the common time reference (CIR) signal 002 at the time the incoming data packet arrived at the input port In a preferred embodiment, the ToA 35T may additionally comprise a port number and a link type indication. The ToA 35T is used by the scheduling controller 45 of the output port 40 in the computation of the forwarding time out of the output port, and shown in FIG. 9. Note that the ToA 35T value that is appended to the incoming data packet is distinct and separate from the time stamp value 35TS that is included as part of the incoming data packet header. After the incoming data packet has the ToA information appended to it, it is routed by the routing controller 35B via respective buses (31-1, 31-N) to the respective appropriate output scheduling controller (36-1, 36-N).

The ToA 35T and time stamp 35TS can have a plurality of numerical formats. For example, the format of the Network Time Protocol [D. Mills, Network Time Protocol (version 3) IETF RFC 1305] is in seconds relative to 0h UTC on Jan. 1, 1900. The full resolution NTP timestamp is a 64-bit unsigned fixed point number with the integer part in the first 32 bits and the fractional part in the last 32 bits. In some fields where a more compact representation is appropriate, only the middle 32 bits are used; that is, the low 16 bits of the integer part and the high 16 bits of the fractional part. The high 16 bits of the integer part must be determined independently.

The incoming data packet can have various formats, such as but not limited to Internet protocol version 4 (IPv4), Internet protocol version 6 (IPv6), and asynchronous transfer mode (ATM) cells. The data packet's PID 35C can be determined by but is not limited to one of the following: an Internet protocol (IP) address, an asynchronous transfer mode (ATM) a virtual circuit identifier, a virtual path identifier (VCI/VPI), Internet protocol version 6 (IPv6) addresses, Internet Multi Protocol Label Swapping (MPLS) or tag switching labels, and an IEEE 802 MAC (media access control) address.

As shown in FIG. 7, each respective one of the output scheduling controllers 36 can issue input request messages 61 to the switch scheduler 60 (not shown). Each respective one of the output scheduling controllers can also receive input schedule messages 62 and input reject messages 63 from the switch scheduler. Further, each respective one of the output scheduling controllers also receives a slot clock output signal 65 from the switch scheduler. Each respective one of the output scheduling controllers 36 includes a plurality of queues, as will be illustrated in greater detail in FIGS. 9 and 10.

Figure 8:
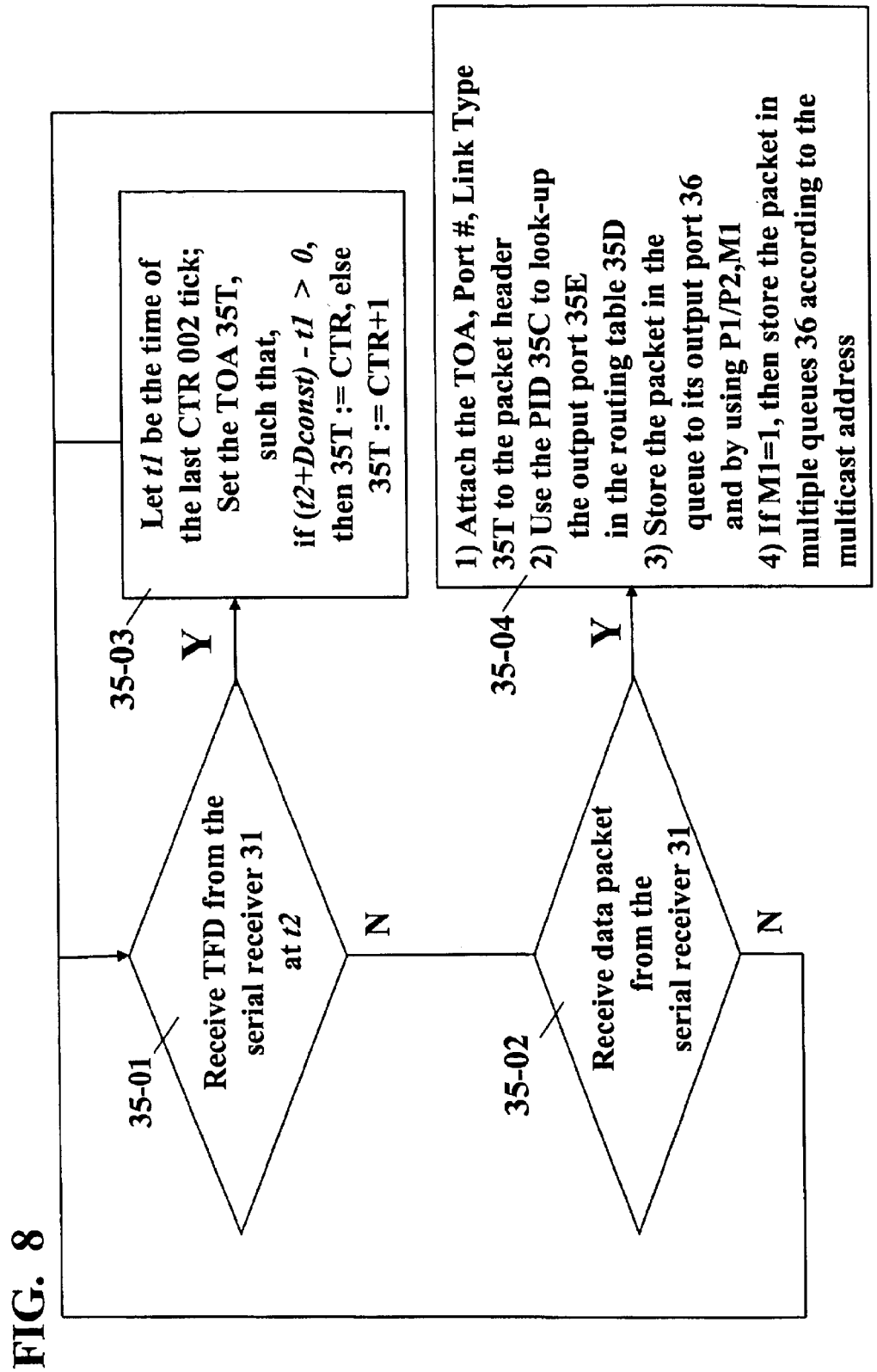
FIG. 8 is a flow diagram describing the operation of the routing controller of the present invention.

FIG. 8 illustrates the flow chart for the input controller 35 processing program executed by the routing controller 35B. The program is responsive to two basic events from the serial receiver 31 of FIG. 7: the received time frame delimiter TFD at step 35-01, and the receive data packet at step 35-02. After receiving a TFD, the routing controller 35 computes the time of arrival (ToA) 35T value at step 35-03 that is to be attached or appended to the incoming data packets.

For the computation of the ToA information 35T the routing controller uses a constant, Dconst, which is the time difference between the common time reference (CTR) 002 tick and the reception of the TFD at time t2 (generated on an adjacent switch by the CTR 002 on that node). This time difference is caused by the fact that the delay from the serial transmitter 49 to the serial receiver 31 is not an integer number of time frames.

When the data packet is received at step 35-02, the routing controller 35B executes the four operations as set forth in step 35-04: attach the ToA information, lookup the address of the queue 36 using the PID, storing the data packet in that queue 36, and decode and process multi-cast indication 35M.

The first operation of step 35-04 attaches or appends the ToA information computed in step 35-3 to the incoming data packet. The ToA information 35T may also include link type and port information, as discussed above. The second operation in step 35-04 uses the PID 35C to reference lookup table 35D to determine the address of the output port 35E of the selected output port queue. The third operation of step 35-04 copies, forwards, or transfers the incoming data packet to the queue 36 responsive to the address 35E.

The fourth operation of 35-04 (decode and process multi-cast indication) may also comprise the method of copying the incoming data packet with appended or attached ToA information into a plurality of the queues 36 to effect a simultaneous multi-cast forwarding operation where the incoming data packet is simultaneously forwarded to more than one output port queue.

Figure 9:
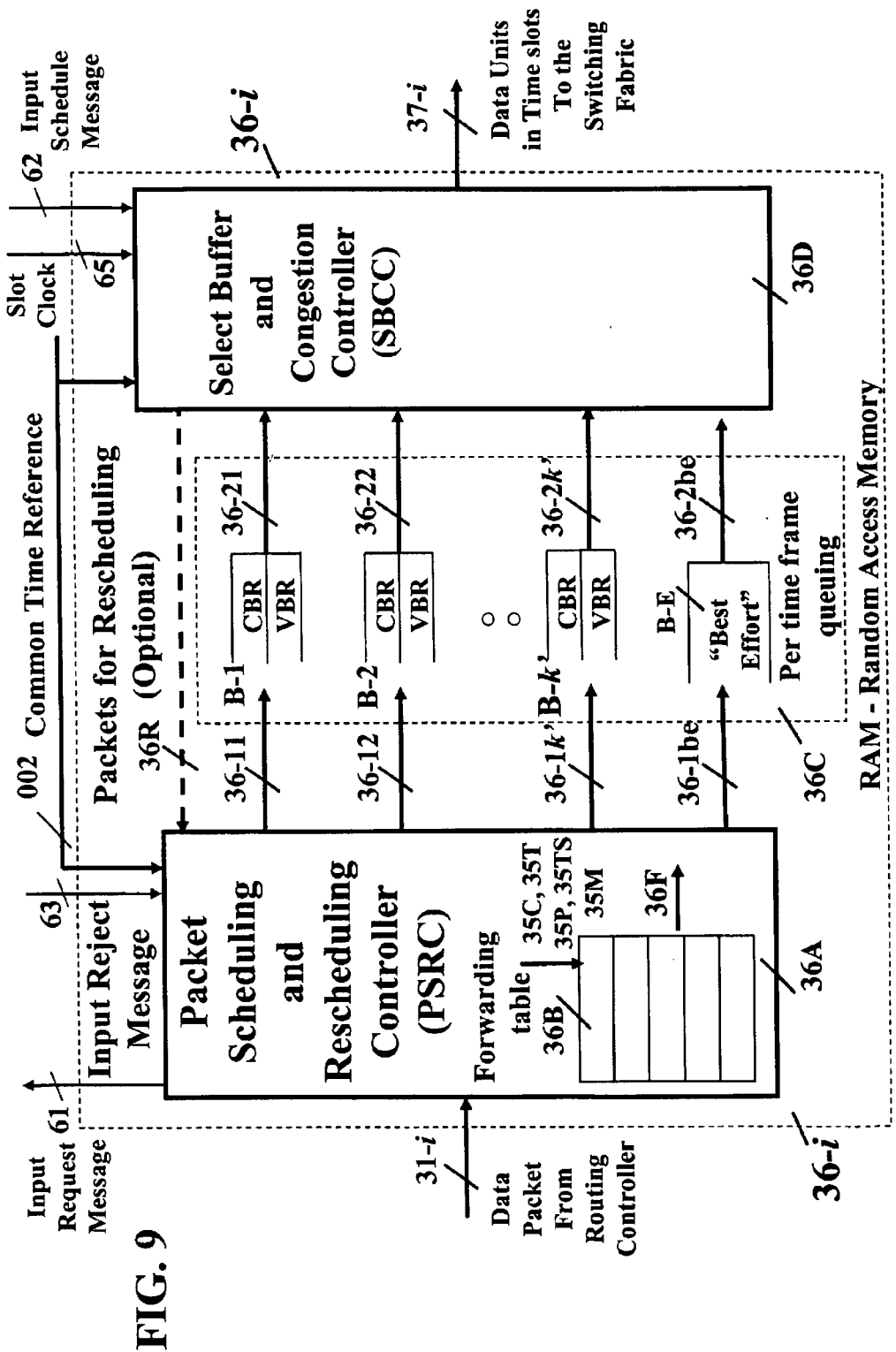
FIG. 9 is a schematic block diagram of an embodiment of an output scheduling controller of the present invention.

FIG. 9 is a schematic block diagram of an embodiment of an output scheduling controller 36-i (i.e., where i is in the range 1 to N, examples including 36-1 and 36-N) of the present invention. The output scheduling controller 36-i comprises a packet scheduling and rescheduling controller (PSRC) 36A, a select buffer and congestion controller (SBCC) 36D, and a random access memory (RAM) 36C. The random access memory 36C comprises a plurality of queues B-1, B-2, . . . B-k', and B-E.

The PSRC 36A is constructed of a central processing unit (CPU), a random access memory (RAM) for storing the data packet, read only memory (ROM) for storing the packet scheduling and rescheduling controller processing program; and a forwarding table 36B that is used for determining which respective ones of the output scheduling controller queues B-1, B-2, . . . B-k', and B-E within 36C that the incoming data packet should be switched to.

The PSRC 36A receives a common time reference signal 002 from the common time reference means 20 (not shown) and accepts input reject messages 63 from the switch scheduler 60 (also not shown). The PSRC also receives an input 31-i (i.e., where i is in the range 1 to N, examples including 31-1 and 31-N of FIG. 7). The PSRC issues input request messages 61 to the switch scheduler. Common time reference 002, input schedule messages 62 and the slot clock signal 65 are received by the SBCC 36D.

The PSRC forwarding table 36B of FIG. 9 uses information contained in an arriving data packet's time stamp value 35TS, the multi-cast indication 35M, the priority indication 35P, the virtual PID indication 35C, and the time of arrival (ToA) information 35T to produce the selection 36F. The selection 36F then indicates which respective ones of the plurality of queues B-1, B-2, . . . B-k', and B-E the data packet should be inserted into.

Within each of the queues B-1, B-2, . . . and B-k' are a plurality of sub-queues CBR, VBR, and MCST. Queue B-E comprises both a "best-effort" sub-queue and a MCST sub-queue. The sub-queues are used to differentiate between the different types of data packet traffic entering each queue, as constant bit rate (CBR), variable bit rate (VBR), best-effort, and multicast (MCST).

The SBCC 36D is constructed of a central processing unit (CPU), a random access memory (RAM) for storing data packets, and a read only memory (ROM) for storing the select buffer and congestion controller processing program. The SBCC produces an output 37-i (i.e., where i is in the range 1 to N, examples including 37-1 and 37-N).

Figure 10:
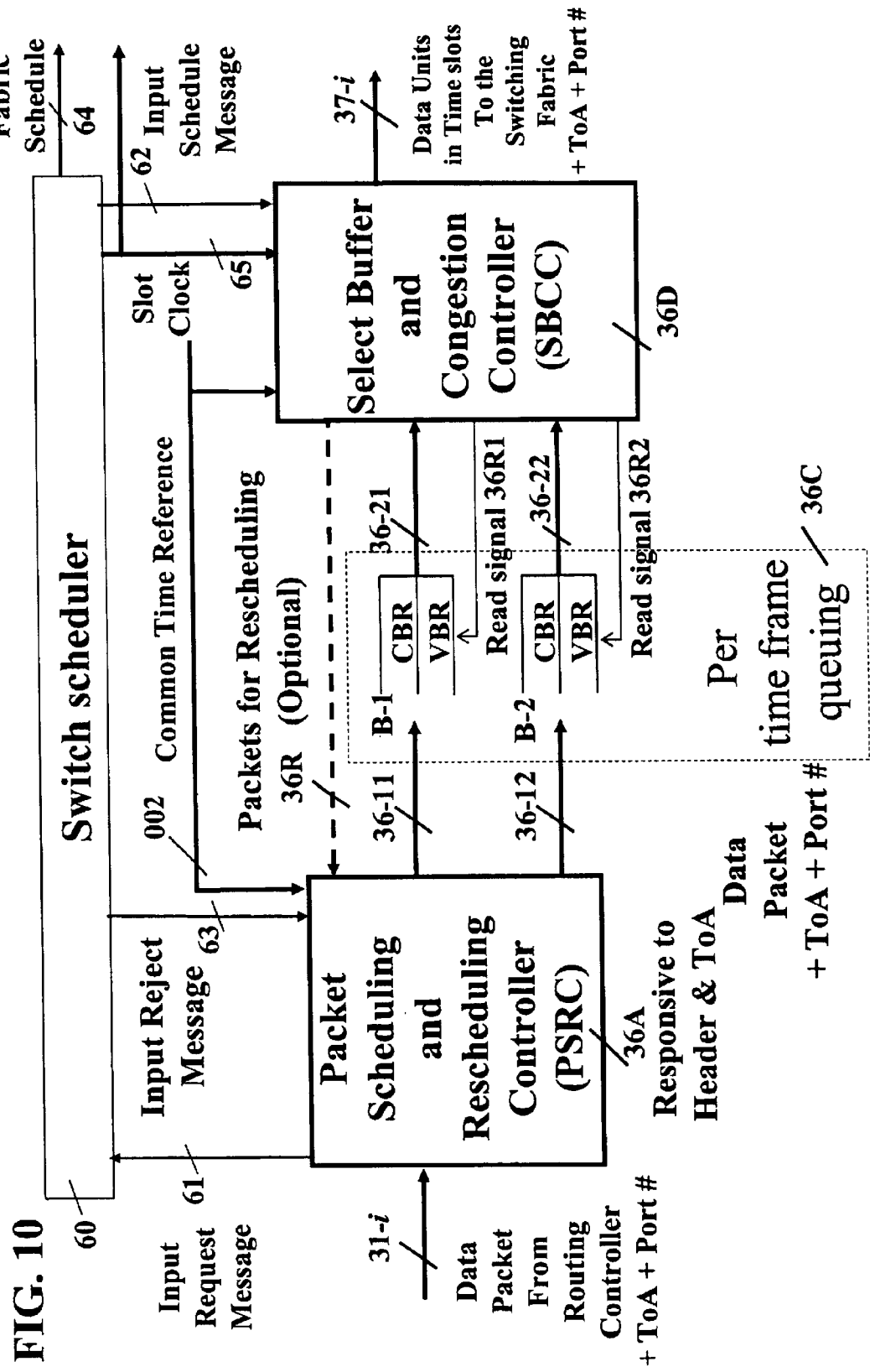
FIG. 10 is a schematic block diagram of an alternate embodiment of an output scheduling controller of the present invention.

FIG. 10 shows an alternate embodiment of the output scheduling controller 36-i (i.e., where i is in the range 1 to N, examples including 36-1 and 36-N) of the present invention. The output scheduling controller 36-i comprises a packet scheduling and rescheduling controller (PSRC) 36A, a select buffer and congestion controller (SBCC) 36D, and a random access memory (RAM) 36C. The RAM 36C comprises a plurality of queues B-1, B-2, and so on. The PSRC 36A is constructed of a central processing unit (CPU), a random access memory (RAM) for storing the data packet, read only memory (ROM) for storing the packet scheduling and rescheduling controller processing program; and a routing table that is used with information contained in an arriving data packet's time stamp value 35TS, the multi-cast indication 35M, the priority indication 35P, the virtual PID indication 35C, and the time of arrival (ToA) information 35T for determining which respective ones of the output scheduling controller queues (e.g., B-1, B-2) that the incoming data packet should be switched to.

The SBCC 36D is constructed of a central processing unit (CPU), a random access memory (RAM) for storing data packets, and a read only memory (ROM) for storing the select buffer and congestion controller processing program. The SBCC is additionally coupled to the RAM 36C by read signals 36R1, 36R2, and so forth, respectively to queues B-1, B-2, and so forth. The signals 36R1, 36R2 et, al., permit the SBCC to select which of the sub-queues (e.g., CBR, VBR) of queues B-1, B-2 et. al., to read.

The SBCC 36D has a feedback output 36R which is coupled to the PSRC 36A. The feedback output 36R is used to indicate that one or more packets queued for scheduled transmission did not successfully transmit. The PSRC uses the output 36R to reschedule and re-enqueue the missed packet in the RAM 36C. The SBCC produces an output 37-i (i.e., where i is in the range 1 to N, examples including 37-1 and 37-N).

The SBCC of both FIGS. 9 and 10 have a similar operation, in that they are responsive to the slot clock 65 and the input schedule messages 62 from the switch scheduler 60 to select a data packet within 36C to forward to output 374. At selected times determined by the switch scheduler, and responsive to the aforementioned slot clock and input schedule messages, the SBCC in each respective output schedule controller 36-i provides data packets to the switch fabric 50.

The PSRC of both FIGS. 9 and 10 have a similar operation, in that they are responsive to input data packets via input 314 to generate input request messages 61 to send to the switch scheduler 60. If the input request message is unable to be honored by the switch scheduler, an input reject message 63 is returned to the PSRC.

The RAM 36C of both FIGS. 9 and 10 have a similar operation, in that it provides the function of enqueuing data packets known to be scheduled from the PSRC and dequeuing the data packets requested by the SBCC.

Each of the queues B-1, B-2, et. al., is designated to store data packets that will be forwarded in each of the respective time frames in every time cycle, as shown in FIG. 4. Data packets which have low priority, as determined by priority indicator 35P, are switched to the queue B-E for "best effort" transmission. Low priority traffic is non-reserved and may include "best effort" traffic and rescheduled data packets.

Figure 11:
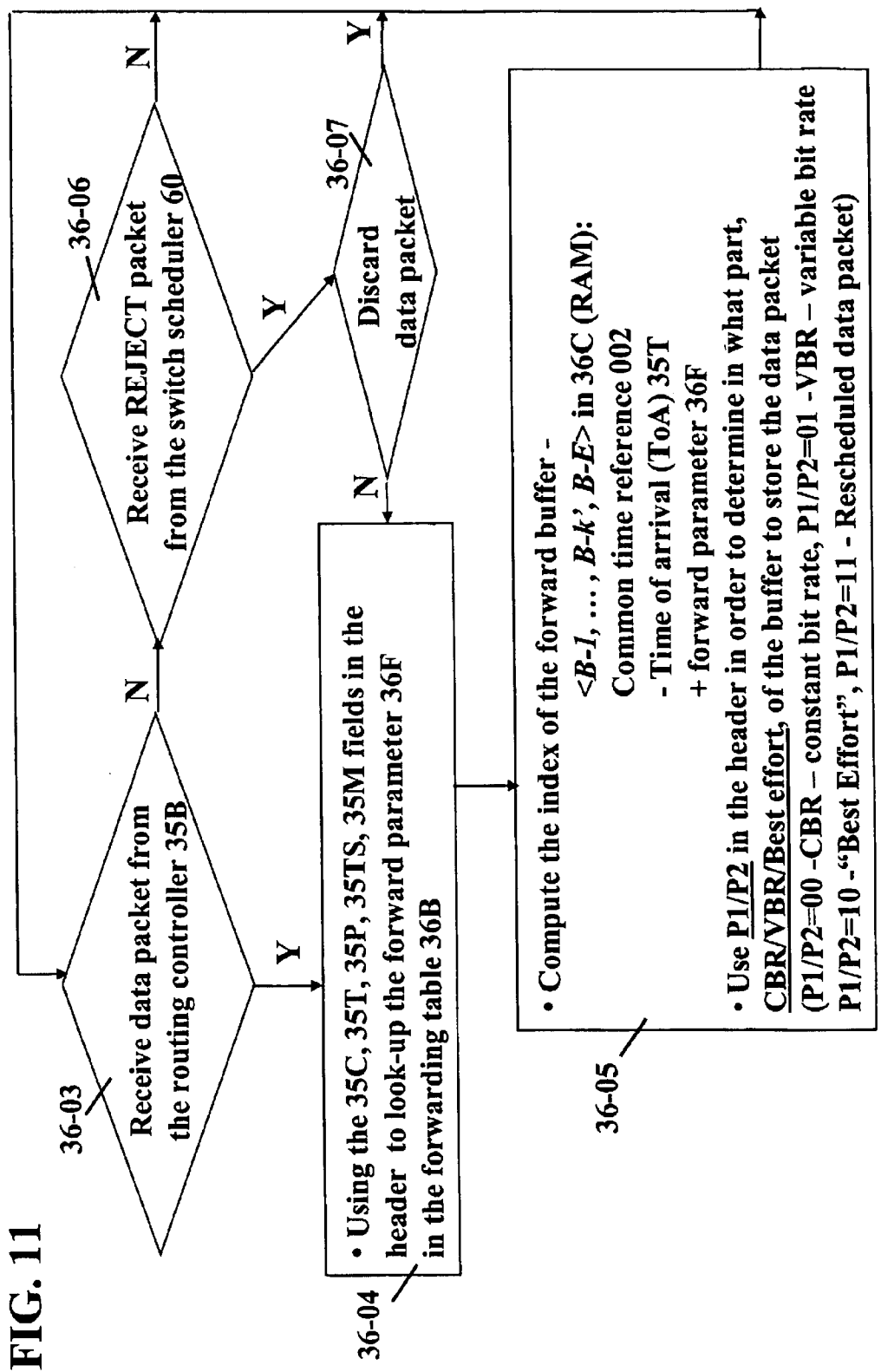
FIG. 11 is a flow diagram describing the operation of the packet scheduling and rescheduling controllers of FIGS. 9 and 10.

FIG. 11 is a flow diagram describing the operation of the packet scheduling and rescheduling controllers of FIGS. 9 and 10. Flow starts at 36-03, in which the determination of whether a data packet has been received from routing controller 35B is made. Upon receipt of the data packet, in step 36-04 the time stamp value 35TS, the multi-cast indication 35M, the priority indication 35P, the virtual PID indication 35C, and the time of arrival (ToA) information 35T are used to lookup the forward parameter 36F in the forwarding table 36B.

If a data packet has not been received at step 36-03, flow proceeds to step 36-06 where the determination is made if a input reject message 63 has been received from the switch scheduler 60. If there has been no input reject message received, flow continues from 36-03.

If an input reject message has been received, at step 36-07 a check is made to see if the data packet which was rejected has been previously rejected. If this is the second rejection, the data packet is discarded as being undeliverable and flow continues at step 36-03. If this is only the first rejection, flow continues at step 36-04.

Upon completing step 36-04, the next operation is at step 36-05 to compute the index of the forwarding buffer within the RAM 36C (i.e., compute the address of the queue in which to place the packet). This address calculation may also include determination of which sub-queue in which to place the data packet (e.g., constant bit rate, variable bit rate, best-effort, and multicast). Upon placing the data packet at the correct corresponding index within the RAM 36C, flow continues at step 36-03.

Figure 12:
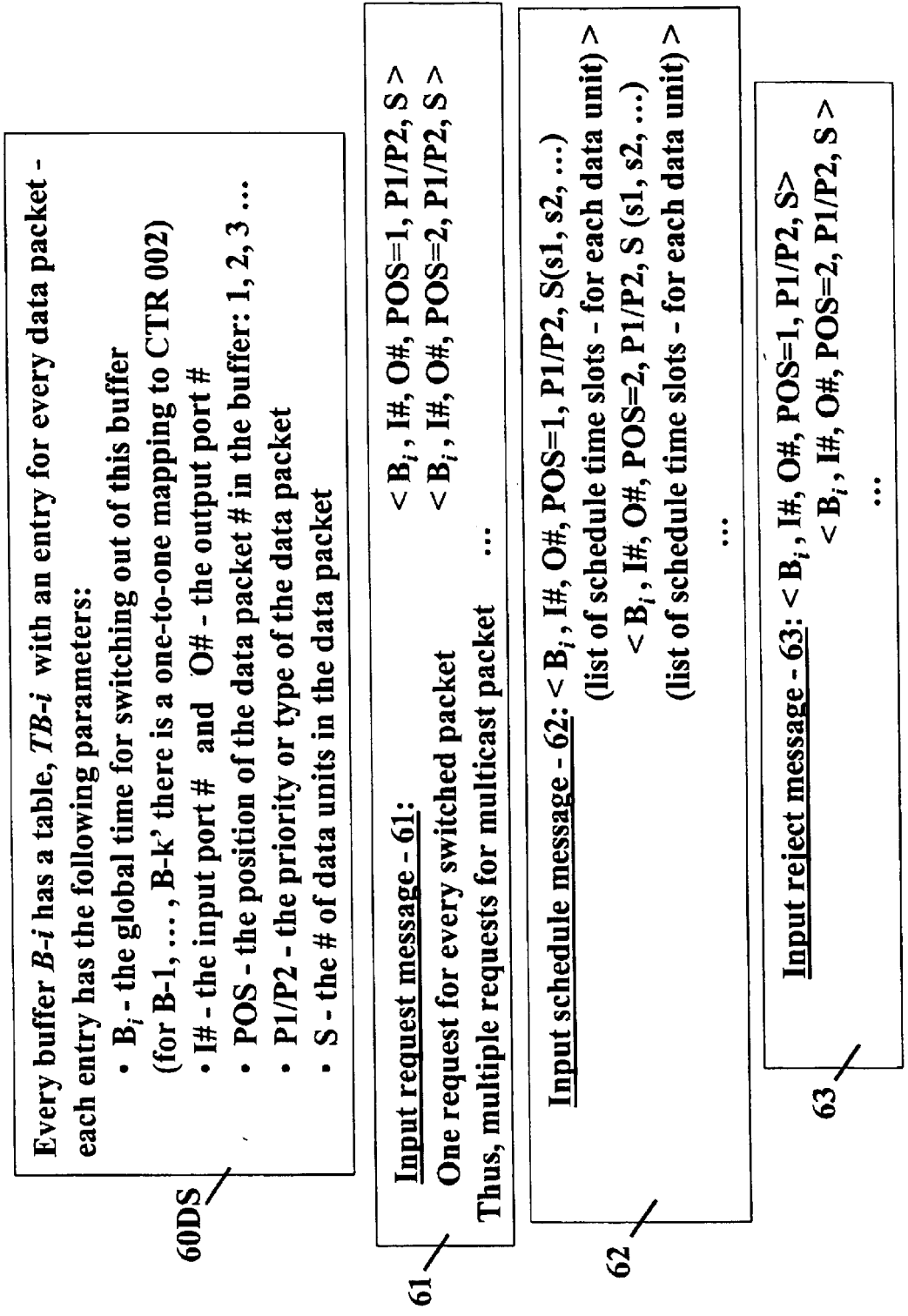
FIG. 12 illustrates details of the input request, reject, and schedule messages of the present invention.

FIG. 12 illustrates details of the input request message 61, input schedule message 62, and input reject message 63 of the present invention. In the preferred embodiment, the input schedule request message 61 comprises the six fields relating to the packet: the global time for switching, the input port number, the output port number, position within the buffer, priority and/or type, and the size. At least one request is made for every data packet to be switched, thus for a multicast data packet (one intended to be forwarded to multiple destinations simultaneously) a plurality of requests must be made, one for each destination.

In the preferred embodiment, the input schedule message 62 comprises the six fields relating to the packet: the global time for switching, the input port number, the output port number, position within the buffer, priority and/or type, and a list. One schedule message is issued for every data packet scheduled to be switched, thus for a multicast data packet a plurality of schedule messages will be issued, one for each successfully scheduled destination. The list in the input schedule message comprises a series of time slot size pairs, wherein each pair includes a time slot in which the data packet is scheduled, and a size indication for each data unit to be switched. The accumulated size of all the size indications in a list is less than or equal to the size of the input request message size field.

In the preferred embodiment, the input reject message 63 comprises the six fields relating to the packet: the global time for switching, the input port number, the output port number, position within the buffer, priority and/or type, and the size. One rejection is issued for every data packet that failed to be scheduled, thus for a multicast data packet it is possible to receive a plurality of input reject messages, one for each failed destination.

Figure 13:
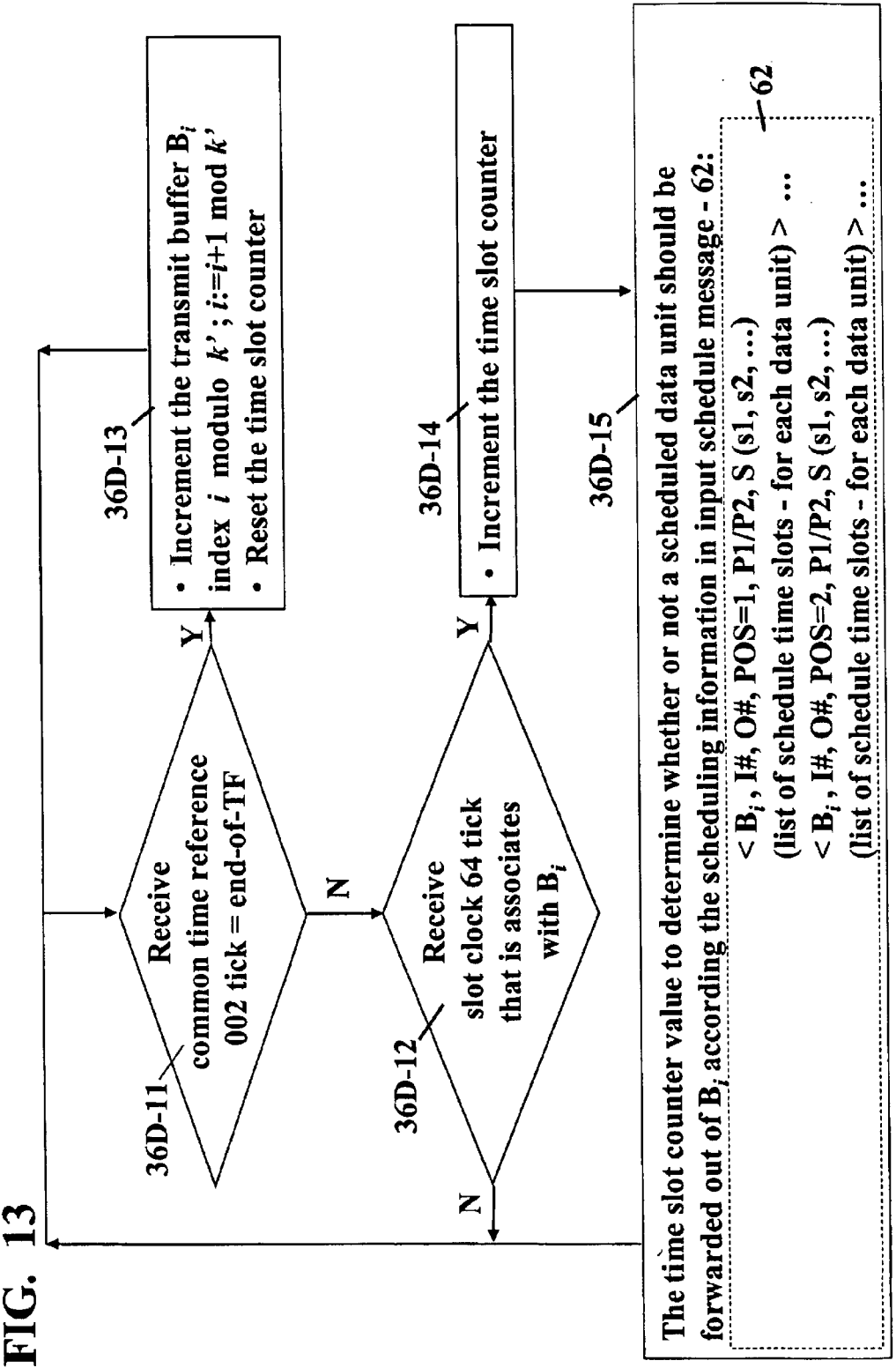
FIG. 13 is a flow diagram describing the operation of the select buffer and congestion controllers of FIGS. 9 and 10.

The flow chart for the program executed by the select buffer controller 45D is illustrated in FIG. 13. The controller 36D determines if a common time reference (CTR) 002 tick (e.g., a pulse or selected transition of the CTR signal) is received at step 36D-11. If the common time reference tick is received, step 36D-13 increments the transmit buffer index i (i.e., i:=i1 mod k', where k' is the number of queues in RAM 36C for scheduled traffic, one for each time frame in a time cycle). The controller 36D also resets a time slot counter before resuming flow at step 36D-11.

At step 36D-12, a determination is made whether a slot clock tick (e.g., a pulse or selected transition of the slot clock signal 64) has occurred. If not, flow continues at step 36D-11. If so, the time slot counter is incremented by one and flow continues with step 36D-15.

At step 36D-15, the present time slot counter value is used to determine if a scheduled data unit should be forwarded out of queue B-i according to the scheduling information in any pending input schedule messages 62 that have been received by the SBCC from the switch scheduler 60. If so, the appropriate data unit is de-queued from the queue B-i and output, and the corresponding respective input schedule message is retired. Flow then continues at step 36D-11.

FIG. 14 illustrates the four pipelined forwarding phases of forwarding data packets as in the present invention. The phases are numbered phase 1, phase 2, phase 3, and phase 4. In the preferred embodiment, each phase is accomplished over a period of time equal to one time frame.

In phase 1, a data packet is received by the input port serial receiver and forwards it to the routing controller 35B where an attachment is made to the data packet header. This attachment includes the ToA of Arrival 35T and may include other information such as but not limited to port number and link type. Also performed in phase 1 is a routing step by the routing controller 35B which directs the data packet to the corresponding output schedule controller(s), as determined by the multicast indication 35M in the header.

In phase 2, the packet scheduling and rescheduling controller 36A receives the data packet from the routing controller and sends an input request message to the switch scheduler 60. The switch scheduler computes the schedule (on the basis of all requests from all PSRCs) and returns one of a input schedule message or an input reject message. If an input schedule message is received, the PSRC enqueues the data packet for switching in the RAM 36C.

In phase 3, the SBCC 36D de-queues and forwards data units responsive to the switch scheduler input schedule messages to the switching fabric 50. The switching fabric immediately forwards the switched data units to the correct output port 40.

In phase 4, the output port 40 forwards the data packet received from the switch fabric 50 to the serial transmitter 49 over links 51 and thus out to communications link 41 to an SVP network.

Note that each data packet is comprised of one or more data units. Consequently, in phase 3, data units are switched from input to output However, in phase 4, data packets are forwarded from the output port to the network.

Figure 15:
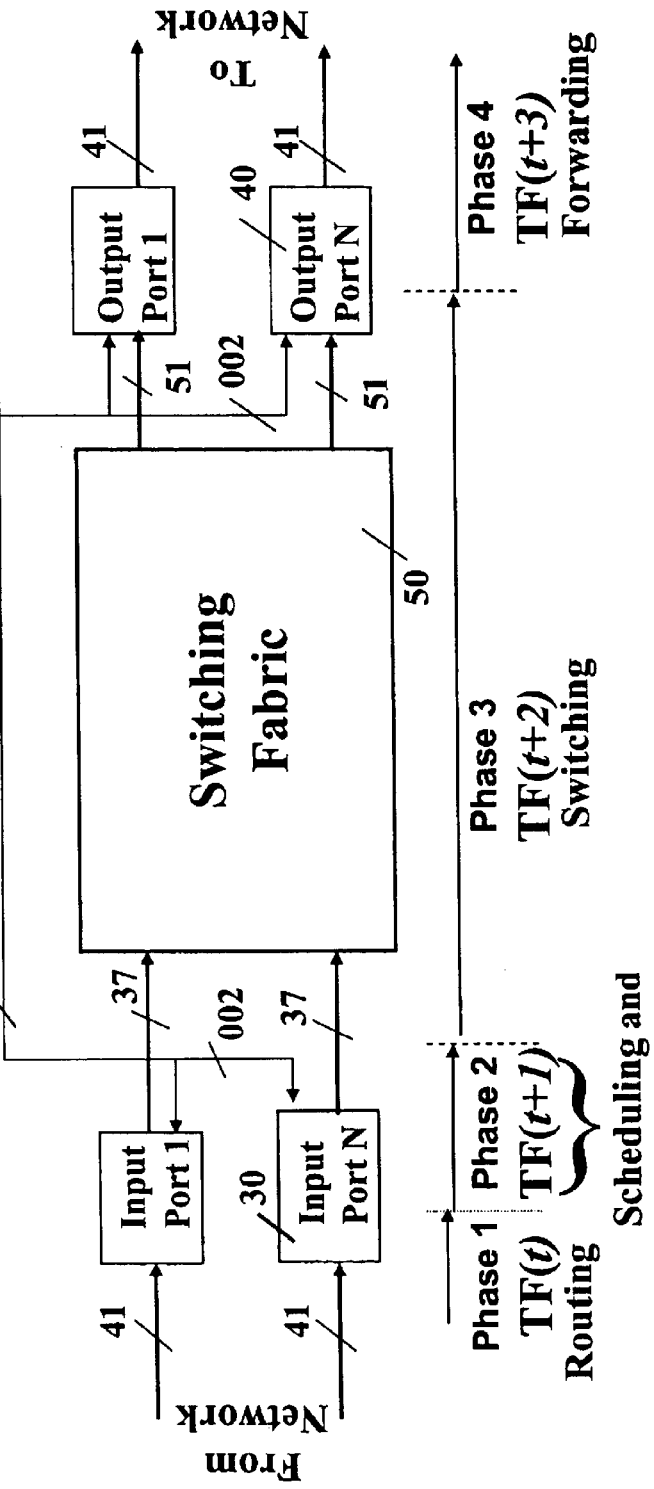
FIG. 15 is a schematic block diagram of the four pipelined forwarding phases of forwarding data packets as in the present invention.

FIG. 15 is a schematic block diagram of the four pipelined forwarding phases of forwarding data packets as in the present invention. As shown in the illustration, data packets in phase 1 have propagated, through the PSRC 36A of the input ports 30 of the SVP switch 10, to the RAM 36C in the input ports 30. In phase 2 the data packet scheduling is done with specific schedule for each of its data units. In phase 3 data units are transited to the switching fabric and have propagated as far as the output port 40 and have been assembled back into their original data packet form. Data packets in phase 4 have propagated entirely through the SVP switch 10 and are enroute to their next switch or destination.

It is to be noted that a data packet need not always advance from one phase to the next as time frames occur. Specifically, a data packet whose input request message 61 has been rejected (i.e., 63) may remain in phase 2 to be rescheduled, or may be discarded, thereby avoiding phases 3 and 4.

Figure 16:
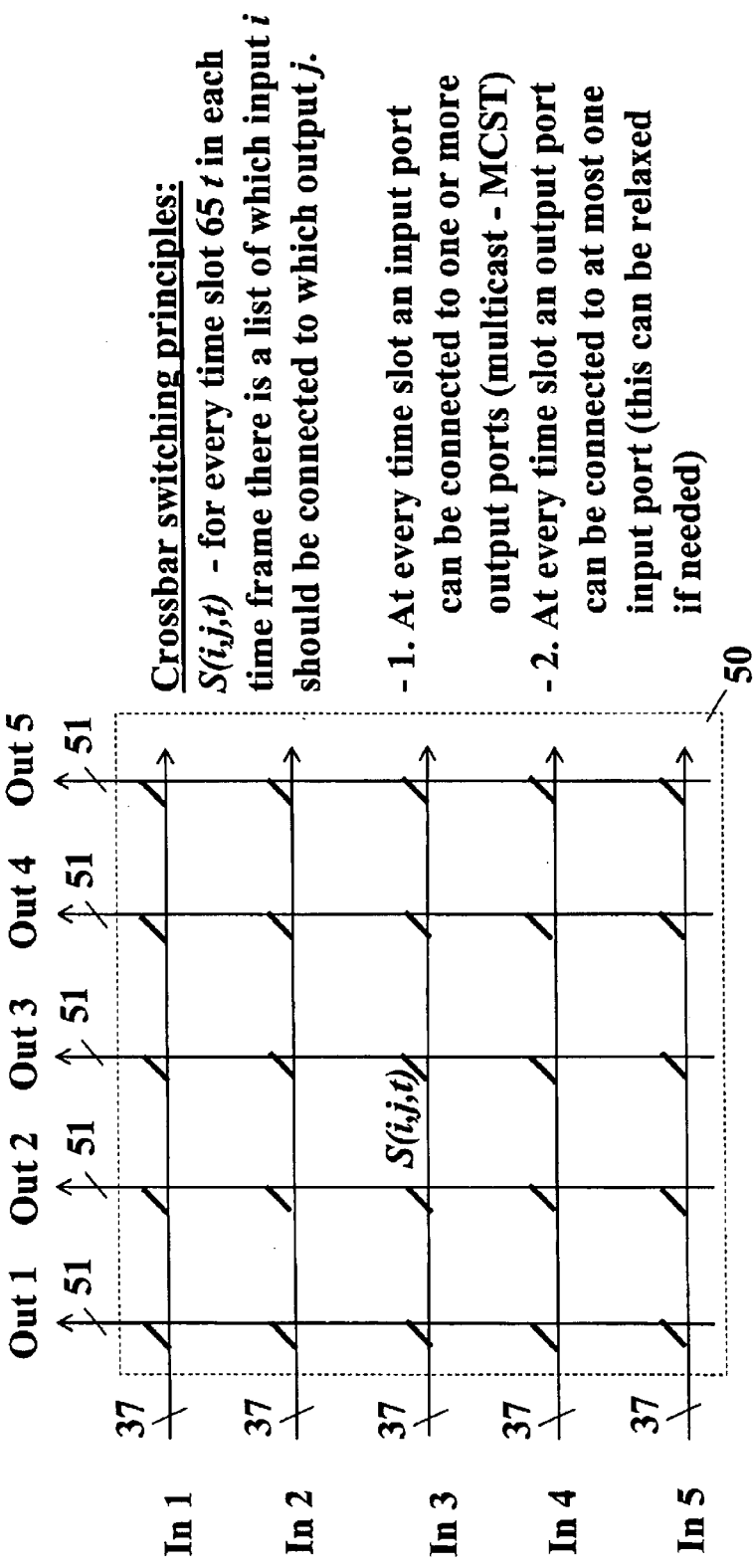
FIG. 16 is a schematic block diagram of one embodiment of the switching fabric of the present invention.

FIG. 16 is a schematic block diagram of one embodiment of the switching fabric 50 of the present invention, that of a crossbar switch. There are various ways to implement a crossbar switching fabric. As shown, a 5-input-by-5-output crossbar switch comprises a plurality of inputs (e.g., In1, In2, In3, In4, In5) selectively coupled in every possible combination with a plurality of outputs (e.g., Out1, Out2, Out3, Out4, Out5). In the preferred embodiment, the number of switch fabric crossbar inputs 37 are equal to the number of input ports 30 and are connected in a one-to-one relationship, respectively. Also in the preferred embodiment, the number of switch fabric crossbar outputs 51 are equal to the number of the output ports 40 and are connected in a one-to-one relationship, respectively. More specifically, for N input ports switch there should be an N-input-by-N-output crossbar fabric.

Each selective coupling of the crossbar switch can be uniquely identified by the corresponding input port i and the output portj. The switch scheduler 60 assembles a composite union of all issued and pending input schedule messages 62 that have been issued to the SBCCs 36D, and produces a fabric schedule message 64. The fabric schedule message for a given time frame includes the set of all selective couplings of input ports i to output portsj at time slots t within the current time frame, and can thus be abbreviated as $S(i,j,t)$. In the preferred embodiment, at every time slot t an input port i can be connected to one or more output portsj to support multicast operations. Within the time frame corresponding to phase 3, the switch fabric crossbar thus is configured in a series of connections, one (possibly non-unique) configuration for each time slot, responsive to the fabric schedule message.

Figure 17:
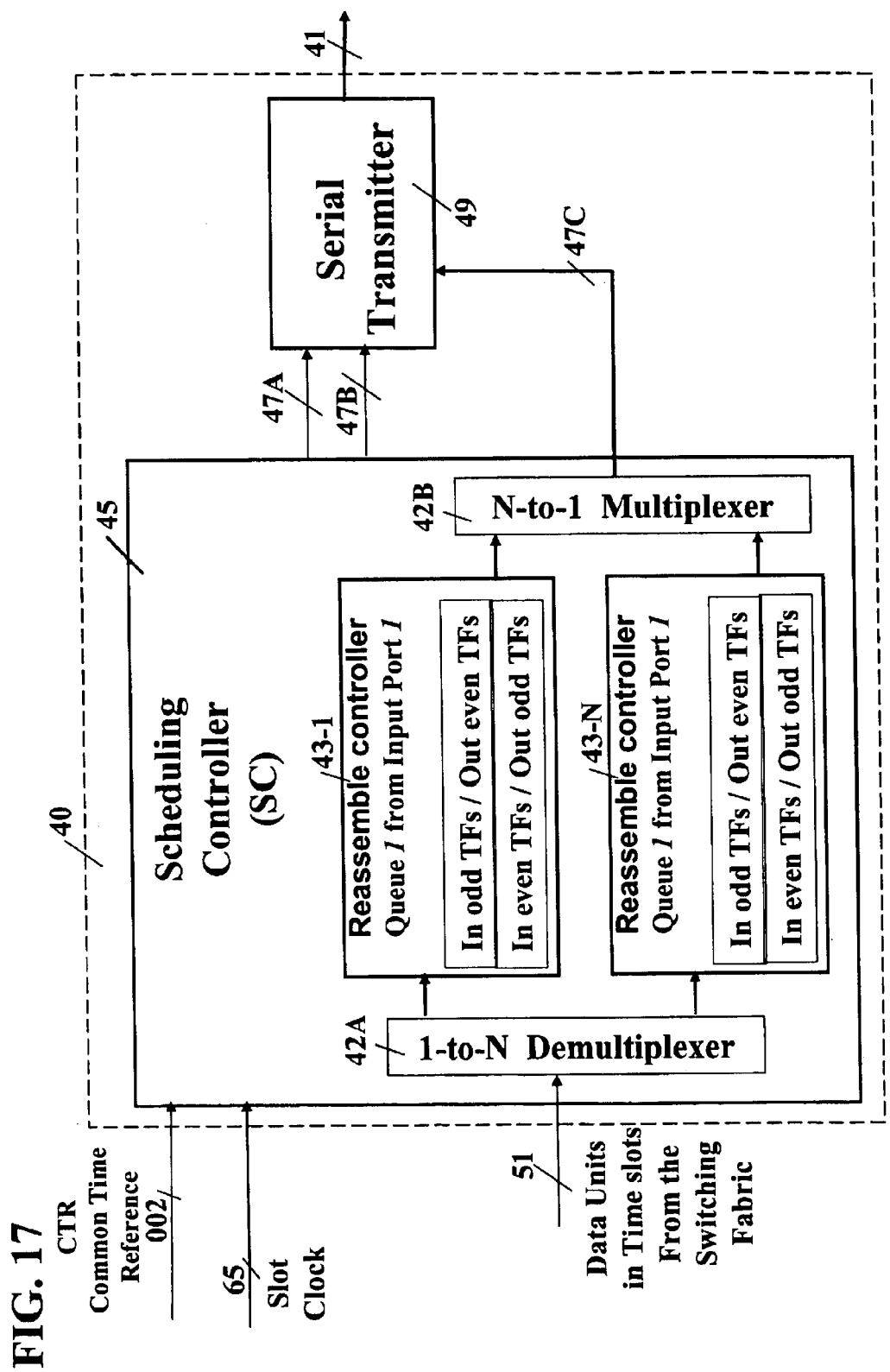
FIG. 17 is a schematic block diagram of an output port of the present invention.

FIG. 17 is a schematic block diagram of an output port of the present invention. The output port 40 comprises a output controller 45, a 1-to-N demultiplexer 42A, an N-to-1 multiplexer 42B, and a serial transmitter 49. The output controller 45 is constructed of a central processing unit (CPU), a random access memory (RAM) for storing the data packet, and read only memory (ROM) for storing the controller processing program. The output controller also comprises a plurality of ressemble controllers (e.g., 43-1, 43-N, collectively as 43), one for each time slot The output controller receives the common time reference 002 and the slot clock 65 from the switch scheduler 60 (not shown).

Each time frame as specified by the common time reference 002 is considered to be one of an even tick or an odd tick. The determination of even tick vs. odd tick is made relative to the beginning of a time cycle. In the preferred embodiment, the first time frame of a time cycle is determined to be an odd tick, the second time frame of the time cycle is determined to be an even tick, the third time frame of the time cycle is determined to be an odd tick, and so forth, where the determination of even tick vs. odd tick alternates as shown for the duration of the time cycle. In an alternate embodiment, the fist time frame of a time cycle is determined to be an even tick, the second time frame of the time cycle is determined to be an odd tick, the third time frame of the time cycle is determined to be an even tick, and so forth, where the determination of even tick vs. odd tick alternates as shown for the duration of the time cycle. The actual sequence of even ticks vs. odd ticks of time frames within a time cycle may be arbitrarily started with no loss in generality.

The 1-to-N demultiplexer 42A accepts data units from the crossbar switch fabric 50 (not shown) and directs the accepted data to one of the plurality of reassemble controllers 43 responsive to the current time slot number.

Each respective reassemble controller (e.g., 43-1, 43-N) comprises an even queue and an odd queue, and accepts data units from the 1-to-N demultiplexer during a respective time slot and assembles those data units into outbound data packets in exclusively one of the even and odd queue responsive to the current time frame. As explained above, predefined ticks of the common time reference signal are defined to be even, and others are defined to be odd. The queues permit reassembly of data packets that may have been divided up into a series of data units in the process of traversing the input ports and the crossbar switch fabric.

During even ticks of the common time reference 002, the even queue of each reassemble controller 43 accepts data from the 1-to-N demultiplexer for the duration of its corresponding respective time slot, and if odd packet assembly has completed, the odd queue supplies a data packet output to the N-to-1 multiplexer 42B.

During odd ticks of the common time reference 002, the odd queue of each reassemble controller 43 accepts data from the 1-to-N demultiplexer for the duration of its corresponding respective time slot, and if even packet assembly has completed, the even queue supplies a data packet output to the N-to-1 multiplexer 42B.

The N-to-1 multiplexer 42B selects among the data packets made available to it from the reassemble controllers 43 and provides an output 47C to the serial transmitter 49. The serial transmitter 49 provides an output to communications link 41 as discussed in detail with respect to FIGS. 5A, 5B, and 5C.

Figure 18:
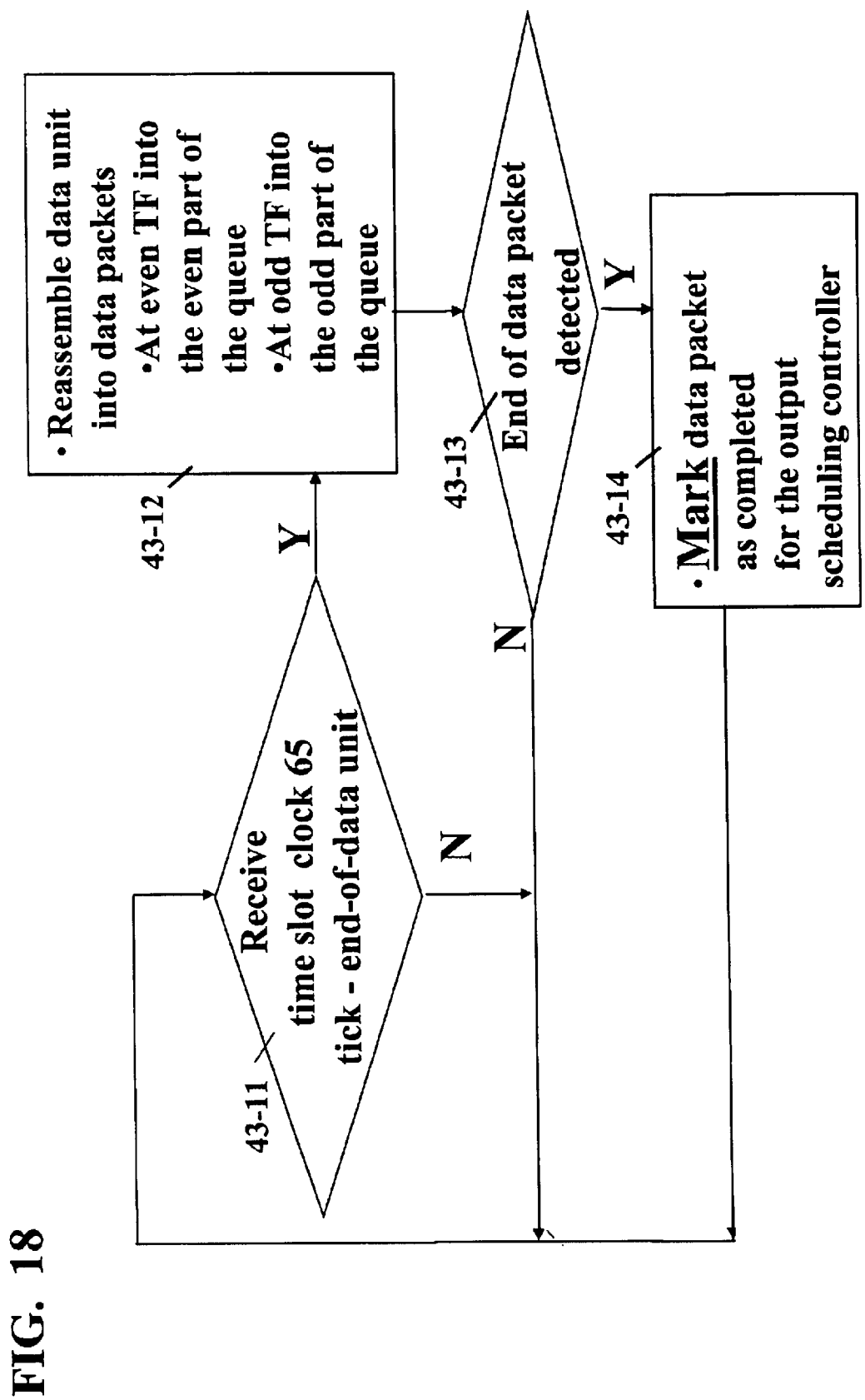
FIG. 18 is a flow diagram describing the operation of a pipelined forwarding phase of the output port of FIG. 17.

FIG. 18 is a flow diagram describing the operation of a pipelined forwarding phase of the output port of FIG. 17. Flow starts and holds at step 43-11 until a determination is made if a complete data unit has been received from the switching fabric. When a complete data unit has been received, flow continues at step 43-12 where the received data unit is added to the appropriate odd or even queue, as discussed in detail above. Upon adding the received data unit to the queue, flow continues to step 43-13 where a check is made to see if the received data unit completes an entire data packet. If and end-of-packet indication is detected in step 43-13, flow continues with step 43-14 where the completed data packet is marked for release to the output controller 45. If an end-of-packet indication was not detected in step 43-13, flow continues with the hold at step 43-11.

Figure 19:
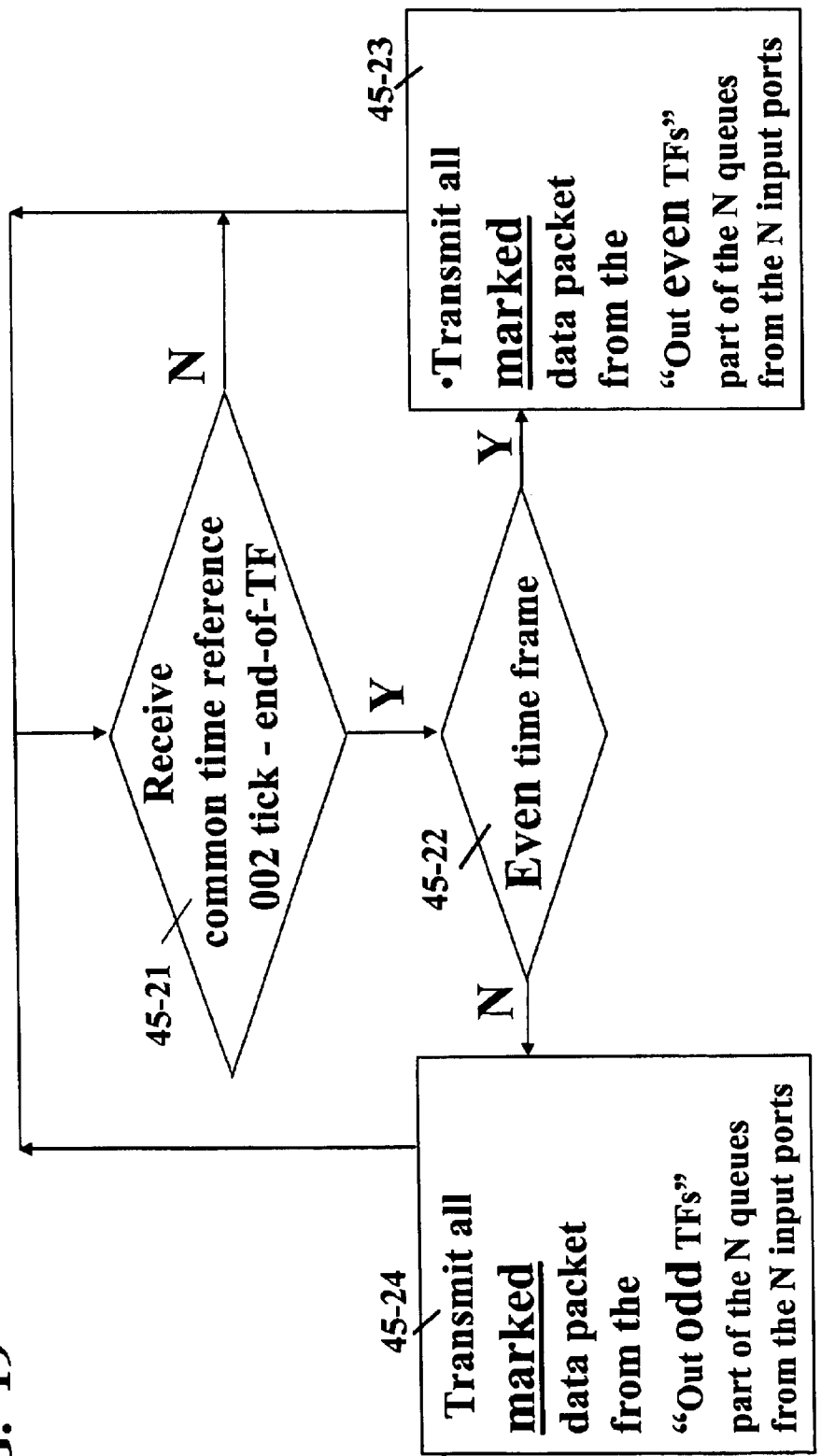
FIG. 19 is a flow diagram describing the operation of another pipelined forwarding phase of the output port of FIG. 17.

FIG. 19 is a flow diagram describing the operation of another pipelined forwarding phase of the output port of FIG. 17. Flow starts and holds at step 45-21 until a common time reference tick, as discussed above, is received. Upon receiving the common time reference tick, the tick is determined to be an odd tick or an even tick in step 45-22. Upon determining the tick to be even in step 45-22, flow continues with step 45-23 in which all marked data packets in the even queues are made available for transmission via the N-to-1 multiplexer 42B and serial transmitter 49 of FIG. 17. Upon completion of transmission of all marked data packets in the even queues, flow continues at the hold of step 45-21. Upon determining the tick to be odd in step 45-22, flow continues with step 45-24 in which all marked data packets in the odd queues are made available for transmission via the N-to-1 multiplexer 42B and serial transmitter 49 of FIG. 17. Upon completion of transmission of all marked data packets in the odd queues, flow continues at the hold of step 45-21.

Figure 20:
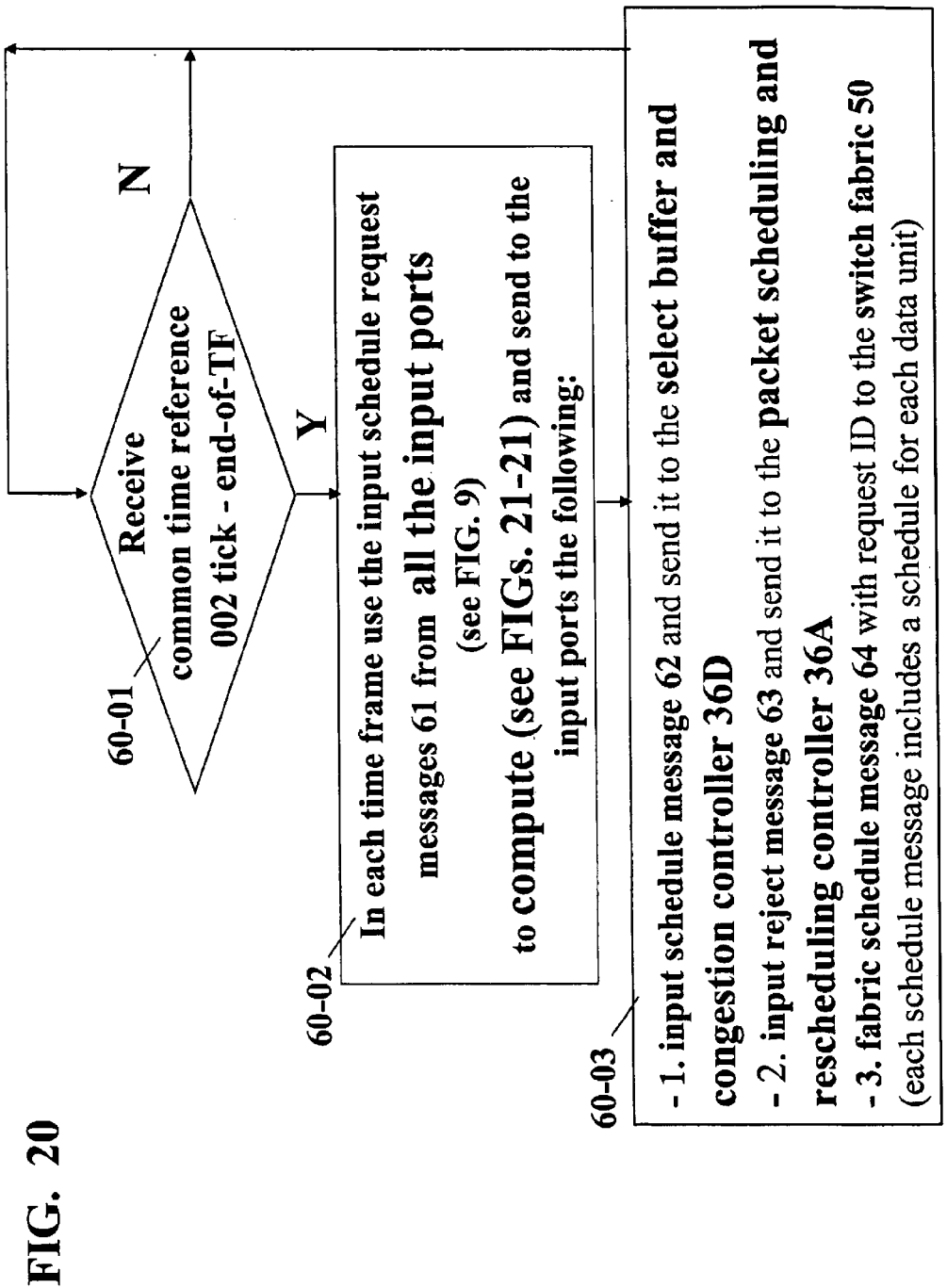
FIG. 20 is a flow diagram describing the operation of the switch scheduling controller of FIG. 1.

FIG. 20 is a flow diagram describing the operation of the switch scheduler 60 of FIG. 1. Flow starts and holds at step 60-01, until a tick of the common time reference 002 is detected. Flow then continues at step 60-02, in which input schedule requests are received from any ones of the input ports 30 (see FIG. 9). Step 60-02 includes the scheduling computation of which of the input schedule requests can be serviced by the switch scheduler 60. Responsive to the scheduling computation of step 60-02, flow continues to step 60-03 where three kinds of output messages are generated by the switch scheduler 60: (1) input schedule messages 62 are relayed back to the appropriate select buffer and congestion controllers 36D in each of the input ports 30 that have been granted a schedule for data; (2) input reject messages 63 are relayed back to the appropriate packet scheduling and rescheduling controllers 36A in each of the input ports 30 that have been denied a schedule for data; and (3) a fabric schedule 64 is relayed to the crossbar switch fabric 50 to schedule data units for transit across the switch fabric.

Figure 21:
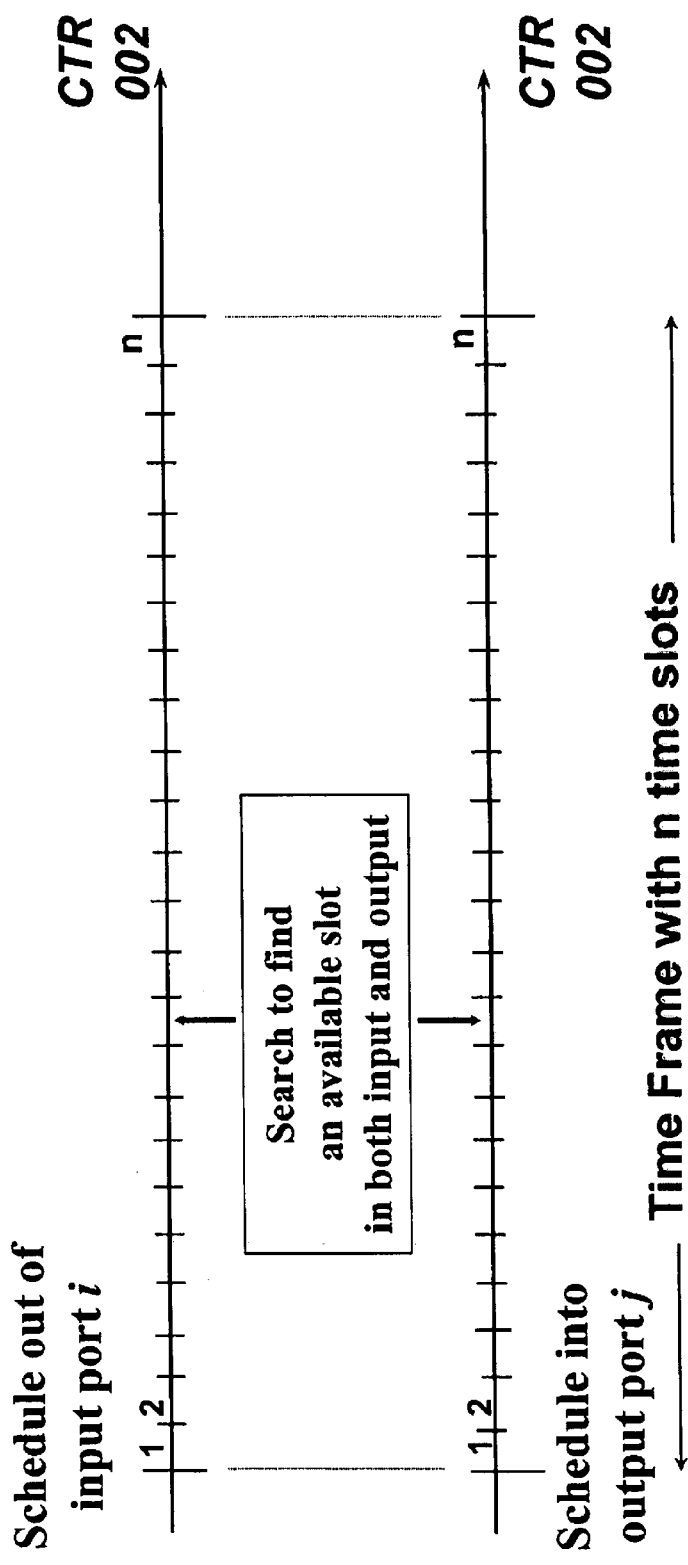
FIG. 21 illustrates details of the scheduling computation of the switch scheduling controller of the present invention.

FIG. 21 illustrates details of the scheduling computation of step 60-02 in the switch scheduler 60. As shown, the switch scheduler 60 maintains a schedule of all possible time slots for each input port i within a time frame, and also a schedule of all possible time slots for each output portj within the same time frame. For a given input schedule request to transit the switch fabric from input port i to output portj, a search is made in the corresponding time slot schedules for simultaneous availability of the same time slot in both time slot schedules for each of the time slots. If both the input port i time slot schedule and the output portj time slot schedule have availability at a given time slot t, then (1) time slot t is marked in both time slot schedules as in use; (2) an input schedule message is issued to input port i; and (3) an entry S(i,j,t) is logged into the fabric schedule message to the crossbar switch fabric (refer to FIG. 16 and accompanying description, above).

Figure 22:
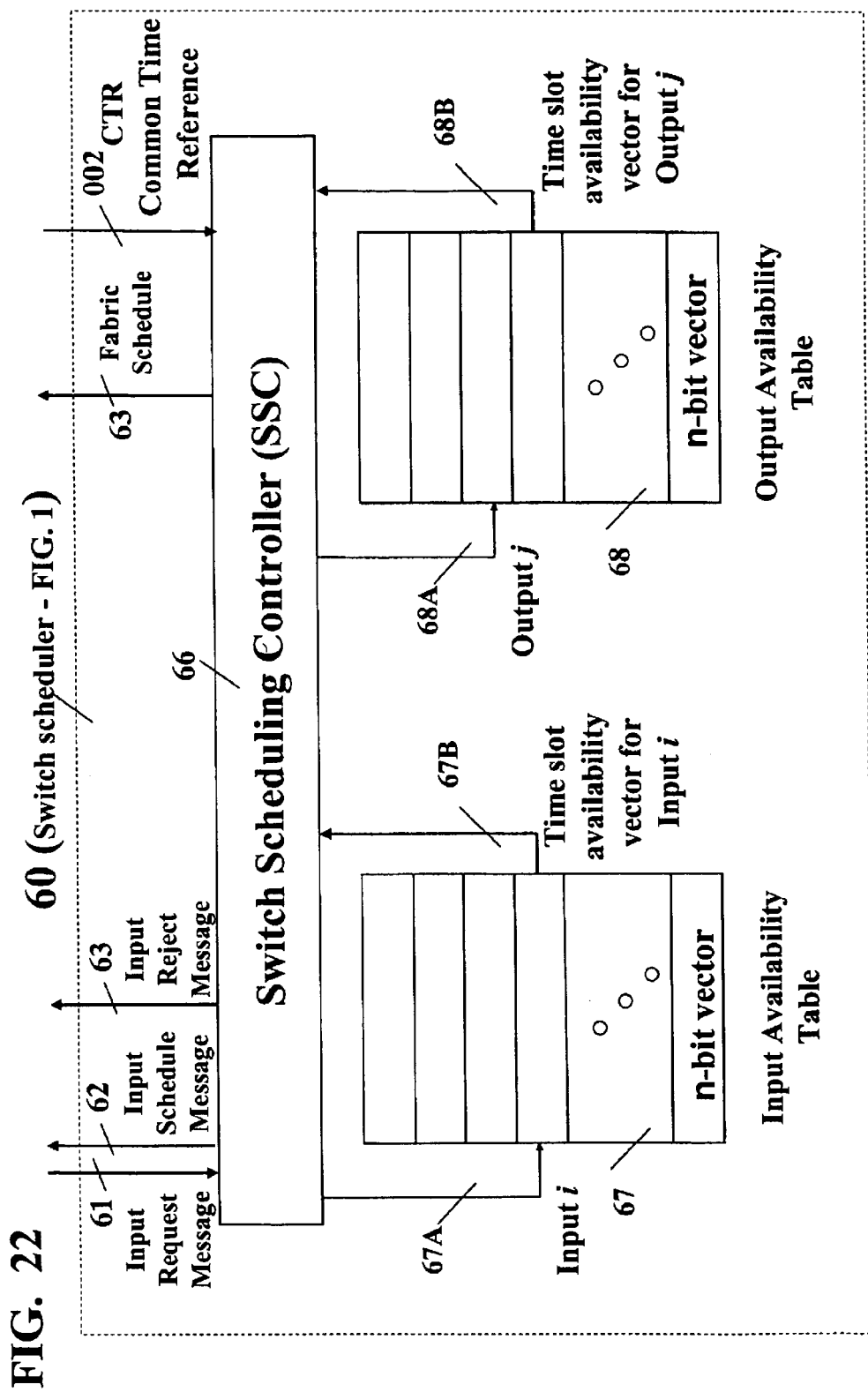
FIG. 22 illustrates additional details of the scheduling computation of the switch scheduling controller of the present invention.

FIG. 22 is a functional block diagram illustrating additional details of the scheduling computation of step 60-02 of FIG. 20. Within the switch scheduler 60 is a switch scheduling controller (SSC) 66, an input availability table 67, and an output availability table 68. The SSC 66 is constructed of a central processing unit (CPU), a random access memory (RAM) for storing the availability tables, and read only memory (ROM) for storing the controller processing program. The SSC receives the common time reference 002 and generates the slot clock 65 output (not shown). The SSC also receives input schedule request messages 61, and generates input schedule messages 62, input reject messages 63, and the crossbar switch fabric's fabric schedule 64.

As discussed above with respect to FIGS. 1, 20, and 21, the switch scheduler 60 maintains a schedule of all possible time slots for each input port i within a time frame in the input availability table 67. The switch scheduler 60 also maintains a schedule of all possible time slots for each output portj within a time frame in the output availability table 68. For a given input schedule request to transit the switch fabric from input port i to output portj, the SSC 66 uses the input port number i to index 67A into the input availability table 67 producing an input availability vector 67B, and the SSC 66 uses the output port numberj to index 68A into the output availability table 68 producing an output availability vector 68B. A search is made in the corresponding availability vectors 67B, 68B for simultaneous availability of the same time slot in both time slot schedules for each of the time slots.

FIG. 23 illustrates further details of the scheduling computation of step 60-02 of FIGS. 20 and 21. As discussed above with respect to FIG. 12, an input schedule request is made for each data packet to be switched. However, the data packet may be sufficiently large as to require multiple time slots for multiple data units to transit the switch fabric 50. As a result of this multiple time slot requirement, the switch scheduling controller 66 may produce a plurality of input schedule messages, one for each of a number of data units, each data unit no larger than the amount of data that can transit the switch fabric in the duration of one time slot.

The computation 60-10, as shown in FIG. 23, describes the initialization and operation of the tables of vectors as discussed above with respect to FIG. 21. At the beginning of each time frame, the input and output availability tables are cleared to indicate all time slots are available. Then for each data unit to be scheduled, the SSC 66 examines each entry in both the input availability vector 67B and the output availability vector 68B looking for the first time slot that has availability in both vectors 67B, 68B. Finding such a time slot determines the slot number in which the data unit to be transferred should be scheduled to transit the crossbar switch fabric 50.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A scheduler system, within an input of a switch, for scheduling a plurality of data packets, each having a respective scheduling header, to be switched to at least one of a plurality of output ports of the switch from a selected one of a plurality of input ports of the switch, the scheduler system comprising:

a memory comprising a plurality of queues;

a packet scheduling and rescheduling controller (PSRC);

wherein each of the plurality of data packets with its respective scheduling header is transferred to the PSRC;

wherein the PSRC is responsive to each of the data packets and its respective scheduling header, for sending an input request message to request a first schedule for switching the respective data packet to at least one of the output ports;

wherein the PSRC further provides means for storing the respective data packet in a selected one of the queues responsive to its respective scheduling header; and a switch controller for scheduling transfer of the data packets during defined time periods responsive to the input request message for sending an input reject message responsive to determining that no current scheduling is available for the respective data packet, wherein the PSRC is responsive to the input reject message for sending a second input request message to request a second schedule for switching the respective data packet to at least one of the output ports.

2. The scheduler system as in claim 1, further comprising:

a select buffer and congestion controller (SBCC);

wherein the switch controller is responsive to the input request message, for sending an input schedule message comprising a specified schedule, responsive to determining an available schedule for the respective data packet; and wherein the SBCC is responsive to the input schedule message, for switching the associated respective data packet to a selected one of the output ports responsive to the specified schedule in said input schedule message.

3. The scheduler system as in claim 2, further comprising a common time reference (CTR);

wherein the CTR is coupled to the scheduler system;

wherein the CTR is divided into a plurality of time intervals; and wherein scheduling is related to the plurality of time intervals.

4. The scheduler system as in claim 3, wherein the input request message is sent to request the first schedule for switching the respective data packet to a selected one of the output ports in a selected one of the predefined time intervals.

5. The scheduler system as in claim 3, wherein the switch controller is responsive to the input request message, for sending an input schedule message responsive to determining an available schedule in one of the predefined time intervals for switching the respective data packet to at least one of the output ports.

6. The scheduler system as in claim 3, wherein the source of the CTR is at least one of global positioning system (GPS), a local clock in the scheduler system, and a timing signal from another scheduler system.

7. The scheduler system as in claim 3, wherein the CTR is divided into a successive sequence of predefined time frames;

wherein each of the predefined time frames is further divided into a successive sequence of at least one predefined time slot; and wherein scheduling is related to the predefined time slot.

8. The scheduler system as in claim 7, wherein the switch controller is responsive to the input request message, for sending an input schedule message responsive to determining that there is an available one of the predefined time slots in at least one of the predefined time frames, for switching the respective data packet to at least one of the output ports.

9. The scheduler system as in claim 8, wherein the SBCC is responsive to the input schedule message, for switching the associated respective data packet to at least one of the output ports during the available time slots in the predefined time frames as contained in said input schedule message.

10. The scheduler system as in claim 2,
wherein there are plurality of packet scheduling and rescheduling controllers (PSRCs) on each of the input ports, wherein each of the PSRC's has an associated one of a plurality of select buffer and congestion controllers (SBCCs); and
wherein the input schedule message that is sent in response to the input request message sent to the switch scheduler from a respective selected one of the PSRCs, is received by a corresponding selected one of the SBCCs.

11. The scheduler system as in claim 2, wherein on each of the input ports there are one PSRC and one SBCC that are associated with a selected one of the output ports.

12. The scheduler system as in claim 2, further comprising:
means for dividing the respective data packet into between one data unit and a plurality of data units, each said data unit of a predefined size; and
means for counting the number of data units divided from each of the respective data packets;
wherein the input request message from the PSRC specifies a first number of data units in said respective data packet; and
wherein the input schedule message is responsive to said input request message and specifies a same first number of schedules, one for each of the first number of data units.

13. The scheduler system as in claim 12, wherein the SBCC is responsive to said input schedule message, and switches the first number of data units of said data packet to at least one of the output ports responsive to the first number of schedules in said input schedule message.

14. The scheduler system as in claim 1, wherein the PSRC, responsive to receiving a predefined number of input reject messages to the same input request message, discards the respective data packet that is associated with said input request message.

15. The scheduler system as in claim 1, wherein the PSRC is responsive to the input reject message, for storing the associated respective data packet in a different one of the queues than the queue originally stored in.

16. The scheduler system as in claim 1,
wherein the PSRC is responsive to the data packet and its scheduling header, for sending a plurality of input request messages; and
wherein each of the input request messages is associated with switching said respective data packet to a selected one of the output ports.

17. The scheduler system as in claim 7, wherein each of the plurality of queues is associated with a defined one of the plurality of time frames.

18. The scheduler system as in claim 7,
wherein the scheduling header contains at least one of the following parameters: time of arrival (ToA), time stamp (TS), pipe identification (PID), priority bits, and multicast bits; and
wherein the ToA and TS are determined responsive to the CTR.

19. The scheduler system as in claim 18, wherein the PSRC is responsive to the respective data packet and at least one of the parameters ToA, TS, and PID, for sending an input request message to request a first schedule in a selected one of the time frames for switching the respective data packet to at least one of the output ports.

20. The scheduler system as in claim 18, wherein the PSRC further provides means for storing the respective data packet in a selected one of the queues responsive to at least one of the parameters ToA, TS, PID, priority bits, and multicast bits, in the associated respective scheduling header.

21. The scheduler system as in claim 18, wherein the PID parameter is at least one of an Internet Protocol version 4 (IPv4) address, an Internet Protocol version 6 (IPv6) address, an Internet Protocol group multicast address, an Asynchronous Transfer Mode (ATM) address, a Virtual Circuit identifier (VCI), a Virtual Path Identifier (VPI), a VCI and a VPI used in combination as VCI/VPI, an Internet Multi Protocol Label Swapping (MPLS) label, an Internet tag switching label, an Institute of Electrical and Electronic Engineers (IEEE) 802 Media Access Control (MAC) address, an IPv4 address together with an IP port number, and an IPv6 address together with an IP port number.

22. The scheduler system as in claim 7,
wherein the consecutive time frames are numbered successively; and
wherein the PSRC, responsive to receiving the data packet at a first time frame number d, will send the input request message at a next subsequent time frame number d+1, wherein d is an integer.

23. The scheduler system as in claim 22, wherein the input request message requests a first switching schedule, to at least one of the output ports, in time frame number d+2, which is next subsequent to time frame number d+1.

24. The scheduler system as in claim 23, wherein responsive to receiving the input reject message, the PSRC requests a second switching schedule to at least one of the output ports, wherein the request for the second switching schedule occurs in at least one of the subsequent time frame numbers d+2, d+3, and d+4.

25. The scheduler system as in claim 18,
wherein the PSRC, responsive to receiving the respective data packet at time frame number d, will send the input request message at time frame number d+e; and
wherein e is a parameter that is determined responsive to at least one of the parameters ToA, TS, and PID.

26. The scheduler system as in claim 25,
wherein the input request message requests a first switching schedule, to at least one of the output ports, in time frame number d+f, wherein f is greater than e; and
wherein f is a parameter that is determined responsive to at least one of the parameters ToA, TS, and PID.

27. The scheduler system as in claim 26,
wherein responsive to receiving input reject message, the PSRC requests a second switching schedule to at least one of the output ports in time frame number d+g, wherein g is greater than e; and
wherein g is a parameter that is determined responsive to at least one of the parameters ToA, TS, and PID.

28. The scheduler system as in claim 22,
wherein there are plurality of packet scheduling and rescheduling controllers (PSRCs) on each of the input ports, wherein there are plurality of select buffer and congestion controllers (SBCCs) on each of the input ports;

wherein each one of the output ports is uniquely associated with a selected one of the plurality of the PSRCs and is uniquely associated with a selected one of the plurality of SBCCs;

wherein a selected one of the PSRC's sends a single input request message, responsive to receiving, at time frame number d, all data packets to be switched to a selected one of the output ports at time frame number d+1; and wherein the switch scheduler sends a single input schedule message to all of the data packets to be switched to a selected one of the output ports at time frame number d+1.

29. The scheduler system as in claim 2, father comprising:

means for determining a position where the respective data packet is located in its respective queue;

wherein the respective queue is uniquely identified;

wherein the input request message contains at least the data packet position and the unique identification of the queue;

wherein the input schedule message, sent to the SBCC responsive to said input request message, is comprised of at least the data packet position and the unique identification of the queue; and wherein the SBCC switches the selected one of the respective data packets responsive to the data packet position and the unique identification of the queue.

30. A scheduling system comprising:

a scheduler for scheduling switching of respective ones of a plurality of data packets, each having an associated respective one of a plurality of input ports and an associated respective one of a plurality of output ports, wherein the input ports are coupled to the output ports by means of a switching fabric;

wherein each input port provides a respective input request message responsive to its receipt of a respective one of the data packets;

wherein time is referenced in consecutive time frames which are sub-structured into a plurality of consecutive time slots, wherein each time slot is characterized as one of available for transfer and unavailable for transfer, from input port to output port; and wherein the consecutive time frames are numbered sequentially;

a first memory unit for separately storing time slot availability data for each of the plurality of input ports;

a second memory unit for separately storing time slot availability data for each of the plurality of output ports; and a switch scheduling controller (SSC) responsive to the input request message for a respective one of the data packets and to the first memory unit and the second memory unit, for selecting a time slot that is available for transfer responsive to both the first memory unit and the second memory unit, wherein the SSC provides an input schedule message output providing an indication of the selected time slot scheduled for the respective data packet responsive to determining that there is a time slot having available availability data in both the first and second memories, and for providing an input reject message output providing an indication of no available time slot for the transfer of the respective data packet responsive to determining that there is no time slot having available availability data in both the first and the second memories.

31. The scheduling system as in claim 30, wherein responsive to the selection of the available selected time slot, the SSC stores unavailable time slot availability data for the selected time slot in the first memory unit and the second memory unit.

32. The scheduling system as in claim 30, wherein the respective data packet is further comprised of a plurality of a first number of data units; and wherein the SSC is responsive to the input request message request for the respective data packet for selecting a second number of time slots that are available in both the first memory unit and the second memory unit.

33. The scheduling system as in claim 32, wherein the first number, of data units, is equal to the second number, of time slots.

34. The scheduling system as in claim 32, wherein the first number, of the data units, is larger than the second number, of the time slots.

35. The scheduling system as in claim 32, wherein in each of time slots, a predefined number of data units can be transferred from the input port to the output port through the switching fabric.

36. The scheduling system as in claim 30, wherein the input request message contains a plurality of scheduling requests, for scheduling the transfer of the respective data packet to a plurality of the output ports.

37. The scheduling system as in claim 30, wherein each one of the input request messages is of at least one of the following priorities: a constant bit rate (CBR) priority, a variable bit rate (VBR) priority, and a best effort (BE) priority;

wherein the SSC is responsive to the reception of more than one input request message, for serving the input request messages with CBR priority before serving the input request messages with VBR priority and the input request messages with BE priority; and wherein the SSC is responsive to the reception of more than one input request message for, serving the input request messages with VBR priority before serving the input request messages with BE priority.

38. The scheduling system as in claim 30, further comprising:

a plurality of SSCs; and a plurality of the second memory units;

wherein each of the second memory units is associated with storing the time slot availability and unavailability of at least one of the plurality of output ports; and wherein each one of the plurality of SSCs is associated with and utilizes a subset of the plurality of second memory units.

39. The scheduling system as in claim 30, further comprising of:

a plurality of SSCs; and a plurality of the first memory units;

wherein each of the first memory units is associated with storing the time slot availability and unavailability of at least one of the plurality of input ports; and wherein each one of the plurality of SSCs is associated with and utilizes a subset of the plurality of first memory units.

40. The scheduling system as in claim 30, wherein the time slots within each of the time frames are numbered sequentially from 1 to n, wherein time slot 1 is at the beginning on the time frame and time slot n is at the end of the time frame; and wherein the SSC, responsive to the input request message, finds an available time slot between 1 and n, responsive to both the first memory unit and the second memory unit.

41. The scheduling system as in claim 40, wherein the SSC, responsive to the input request message, finds a first time slot that is first available, responsive to both the first memory unit and the second memory unit, starting the search at time slot 1 and searching towards time slot n.

42. The scheduling system as in claim 40, wherein the SSC, responsive to the input request message, finds a first time slot that is available, responsive to both the first memory unit and the second memory unit, starting the search at time slot n and searching towards time slot 1.

43. The scheduling system as in claim 40, wherein the SSC, responsive to the input request message, finds a first time slot that is available, responsive to both the first memory unit and the second memory unit, starting the search at a random time slot between 1 and n and searching towards at least one of time slot 1 and time slot n.

44. The scheduling system as in claim 40, wherein when the SSC, responsive to the input request message, does not find an available time slot between 1 and n, the SCC repeats the search in n time slots of at least one of the next time frame, the next, next time frame and the next, next, next time frame.

45. The scheduling system as in claim 30, wherein the SSC, responsive to the input request message received at time frame d for a respective one of the data packets, and responsive to the first memory unit and the second memory unit, provides for selecting a time slot that is available in at least one of time frame d, time frame d+1, time frame d+2, and time frame d+3.

46. The scheduling system as in claim 30,
wherein each of the input request messages is comprised of at least one of the following priorities: a constant bit rate (CBR) priority, a variable bit rate (VBR) priority, and a best effort (BE) priority; and
wherein the SSC, responsive to the input request message of at least one of the VBR priority and the BE priority received at time frame d, and responsive to the first memory unit and the second memory unit, provides for selecting a time slot that is available at time frame d+1, only after there are no more input request messages with the CBR priority to be scheduled at time frame d+1.

47. The scheduling system as in claim 30, wherein the SCC sends an input reject message responsive to receiving the input request message at time frame d and not finding a schedule in at least one of time frame d, time frame d+1, time frame d+2, and time frame d+3.

48. The scheduling system as in claim 30,
wherein the SSC sends a fabric schedule message to the switching fabric; and
wherein the fabric schedule message provides same information as the input schedule message comprising an indication of the selected time slot scheduled for the respective data packet to be switched from a selected one of the input ports to a selected one of the output ports.

49. The scheduling system as in claim 48, wherein the switching fabric, responsive to the fabric scheduling message, connects a selected one of the input ports to a selected one of the output ports at a same time as the respective data packet is forwarded out of the selected input port.

50. A packet system for receiving a plurality of data packets from a plurality of input ports, wherein the input ports are coupled to an output port by means of a switching fabric, wherein each data packet is comprised of at least one data unit, wherein time is received from a common time reference and is divided into consecutive time frames which are sub-structured into a plurality of consecutive time slots, the system comprising:
a memory comprising a plurality of queues;
a demultiplexer for converting a stream of data units from the switching fabric into a plurality of streams of data units into the plurality of queues;
a multiplexer for converting a plurality of streams of data units from the plurality of queues into a single stream of data units; and
a scheduling controller (SC) for controlling the operation of the demultiplexer and multiplexer;
wherein the time frames have defined boundaries that are signaled by mans of the common time reference that is coupled to the scheduling controller (SC);
wherein the time slots have defined boundaries that are signaled by means of a slot clock that is coupled to the SC; and
wherein each of the plurality of queues is uniquely associated with a respective selected one of the input ports, for receiving data units from a selected one of the input ports via the switching fabric.

51. The packet system as in claim 50, wherein transmission duration of each of the data units is at most one time slot.

52. The packet system as in claim 51,
wherein during each time slot from zero to a plurality of data units are transferred into the memory; and
wherein each of the data units is stored in a predefined one of the queues.

53. The packet system as in claim 50,
wherein the contiguous time frames are numbered sequentially;
wherein two queues are associated with each one of the input ports;
wherein the first one of the two queues is an odd queue and the second one of the two queues is an even queue;
wherein during the odd numbered time frames, the data units originated by a selected one of the input port are transferred to the odd queue that is associated with said input port; and
wherein during the even numbered time frames, the data units originated by a selected one of the input port are transferred to the even queue that is associated with said input port.

54. The packet system as in claim 53,
wherein each data unit in said data packet is at least one of the following: a first data unit, a middle data unit, and a last data unit; and
wherein the plurality of streams of data units into each of the plurality of queues are reassembled into a plurality of data packets by using at least one of the data packet last data unit and the data packet first data unit.

55. The packet system as in claim 54, further comprising:
a serial transmitter;
wherein during the odd time frames the data packets from the even queues are transferred to the serial transmitter via the multiplexer; and
wherein during the even time frames the data packets from the odd queues are transferred to the serial transmitter via the multiplexer.

56. The packet system as in claim 50, wherein the switching fabric transfers all the data units of a selected one of the data packets from a selected one of the input ports, before transferring any data units of another data packet from said input port.

57. The packet system as in claim 50,
wherein the data packets are Asynchronous Transfer Mode (ATM) cells; and
wherein each data unit is comprised of at least one ATM cell.

58. The packet system as in claim 50,
wherein the data packets are a mix of Internet Protocol (IP) packets and Asynchronous Transfer Mode (ATM) cells; and
wherein each data unit is at least one of at least one ATM cell and at most one whole IP packet.

59. A switching system for transferring a plurality of data units from a plurality of input ports to a plurality of output ports, wherein the input ports are coupled to the output ports by means of a switching fabric, wherein time is referenced in consecutive time frames which are sub-structured into a plurality of consecutive time slots, the system comprising:
 a switch scheduler (SS) for controlling the operation of the switching fabric, comprising means to compute a plurality of switching schedules for transferring data units during the plurality of time slots from the plurality of input ports to the plurality of output ports;
  wherein the time slots have defined boundaries that are signaled by means of a slot clock that is coupled to the switching fabric;
  wherein the data unit transfer duration is at most one time slot; and
  wherein the SS computes all the switching schedules for all time slots in a selected one of the time frames immediately prior to the beginning of that respective selected one of the time frames.

60. The switching system as in claim 59, wherein the switching fabric transfers at most one data unit from each input port during each of the time slots.

61. The switching system as in claim 59, wherein the switching fabric transfers at most one data unit to each output ports during each of the time slots.

62. The switching system as in claim 59, wherein the switching fabric is a crossbar switch with N sets of input lines, N sets of output lines, and N×N (N times N) sets of switching elements.

63. The switching system as in claim 62, wherein the switching schedule is provided by the SS to a subset of the switching elements for every time slot.

64. The switching system as in claim 62, wherein a subset of the switching elements can connect one input to multiple output ports during the same time slot.

65. The switching system as in claim 59,
wherein there is a plurality of switching fabrics;
wherein there is a plurality of switch schedulers; and
wherein each of the switch schedulers is uniquely associated with a subset of the switching fabrics.

66. A switching system for transferring a plurality of data units from a plurality of input ports to a plurality of output ports, wherein the input ports are coupled to the output ports by means of a switching fabric, wherein time is referenced in time frames which are sub-structured into a plurality of time slots, the system comprising:
 a switch scheduler (SS) for controlling the operation of the switching fabric, comprising means to compute a plurality of switching schedules for transferring data units during the plurality of time slots from the plurality of input ports to the plurality of output ports;
  wherein the time slots are signaled by means of a slot clock that is coupled to the switching fabric, and wherein the SS provides for scheduling switching of respective ones of a plurality of data packets each having an associated respective one of the plurality of input ports and an associated respective one of the plurality of output ports;
 wherein each of the data packets is comprised of at least one data unit;
 a first memory unit coupled to the SS for separately storing time slot availability data for each of the plurality of input ports;
  wherein each input port provides a respective input request message responsive to its receipt of a respective one of the data packets, and
  wherein each time slot is characterized as one of available for transfer and unavailable for transfer, from input port to output port;
 a second memory unit coupled to the SS the for separately storing time slot availability data for each of the plurality of output ports;
  wherein the SS is responsive to the input request message for a respective one of the data packets and to the first memory unit and the second memory unit, for selecting a time slot that is available for transfer responsive to both the first memory unit and the second memory unit, and
  wherein the SS provides an input schedule message output providing an indication of the selected time slot scheduled for the respective data packet responsive to determining that there is a time slot having available availability data in both the first and second memory units, and for providing an input reject message output providing an indication of no available time slot for the transfer of the respective data packet responsive to determining that there is no time slot having available availability data in both the first and the second memory units;
 an input port further comprising:
  a packet scheduling and rescheduling controller (PSRC);
   wherein each of the plurality of data packets is transferred to the PSRC,
   wherein the PSRC is responsive to each of the data packets, for sending the input request message to request a first schedule for switching the respective data packet to at least one of the output ports, and
   wherein the SS provides the input schedule message for scheduling transfer of the data packets during defined time periods responsive to the input request message and provides for sending the input reject message responsive to determining that no current scheduling is available for the respective data packet, wherein the PSRC is responsive to the input reject message for sending a second input request message to request a second schedule for switching the respective data packet to at least one of the output ports;

an output port further comprising:
  a queue memory comprising a plurality of queues;
  a demultiplexer for converting a stream of data units from the switching fabric into plurality of streams of data units into the plurality of queues;
  a multiplexer for converting a plurality of streams of data units from the plurality of queues into a single stream of data units; and
  a scheduling controller (SC) for controlling the operation of the demultiplexer and multiplexer;
  wherein the time frames have defined boundaries that are signaled by means of a common time reference that is coupled to the SC, and
  wherein each of the plurality of queues is uniquely associated with a respective selected one of the input ports, for receiving data units from a selected one of the input ports via the switching fabric.

* * * * *